(12) United States Patent
Fukagawa et al.

(10) Patent No.: US 7,494,534 B2
(45) Date of Patent: Feb. 24, 2009

(54) METHOD, DEVICE, AND SYSTEM FOR CONTROLLING DISSOLVED AMOUNT OF GAS

(75) Inventors: Masayuki Fukagawa, Ube (JP);
Kesayoshi Hadano, Ube (JP); Tetsuhiko Fujisato, 2-48 Nohara 2-chome, Ube-shi, Yamaguchi, 755-0024 (JP);
Ryosaku Fujisato, Ube (JP)

(73) Assignees: Tetsuhiko Fujisato, Yamaguchi (JP);
Yoshiaki Ikeda, Yamaguchi (JP)

( * ) Notice: Subject to any disclaimer, the term of this patent is extended or adjusted under 35 U.S.C. 154(b) by 648 days.

(21) Appl. No.: 10/545,626

(22) PCT Filed: Feb. 12, 2004

(86) PCT No.: PCT/JP2004/001499

§ 371 (c)(1),
(2), (4) Date: Aug. 13, 2005

(87) PCT Pub. No.: WO2004/071635

PCT Pub. Date: Aug. 26, 2004

(65) Prior Publication Data

US 2006/0144241 A1 Jul. 6, 2006

(30) Foreign Application Priority Data

Feb. 13, 2003 (JP) ............................. 2003-076589
Dec. 15, 2003 (JP) ............................. 2003-436565

(51) Int. Cl.
*B01D 19/00* (2006.01)
*C02F 1/20* (2006.01)

(52) U.S. Cl. ............................. 96/168; 96/176; 96/200; 95/24; 95/241; 95/266; 210/221.2; 261/76; 261/DIG. 26

(58) Field of Classification Search ................... 95/266, 95/242, 241, 24; 96/176, 200, 168; 210/221.2; 261/28, 76, DIG. 26
See application file for complete search history.

(56) References Cited

FOREIGN PATENT DOCUMENTS

| JP | 54-2695 | * | 2/1979 |
| JP | 8-323171 | | 12/1996 |
| JP | 2000161278 A | * | 6/2000 |
| JP | 2000325703 A | * | 11/2000 |
| JP | 2003126884 A | * | 5/2003 |
| JP | 2003190750 A | * | 7/2003 |

* cited by examiner

*Primary Examiner*—Duane S Smith
*Assistant Examiner*—Douglas J Theisen
(74) *Attorney, Agent, or Firm*—Muramatsu & Associates

(57) ABSTRACT

A device for controlling a dissolved amount of gas. The device is formed of: a pressure reducing part constructed by connecting a hole provided at an upper part of a closed tank to a vacuum pump through a pipe; an injection supply part for injecting fluid to be treated pressurized by a pressurizing pump from the upper part of the tank; a liquid foam generating container where the injected fluid to be treated is received, then gas of the reduced pressure space is involved in, and an air bubble group rises along an inner peripheral wall and is separated from the liquid, and then changes into liquid bubbles in an upper region; a recovery pump part for allowing the liquid bubbles having overflowed from the container; and a tank water level sensor part for maintaining a water level of the treated fluid.

5 Claims, 10 Drawing Sheets (A)

| | Tank Pressure | DO | | Tank Pressure | DO | Processing rate L/min |
|---|---|---|---|---|---|---|
| Air | 0 | 12.1 | Oxygen | 0 | 55.1 | 27.4L |
| | 0.08MPa | 19.2 | | 0.08MPa | 74.8 | 24.0L |
| | 0.16MPa | 25.7 | | 0.16MPa | 116.2 | 20.1L |
| | 0.24MPa | 31.2 | | 0.24MPa | 173.3 | 16.2L | ded amount of gas which can be
METHOD, DEVICE, AND SYSTEM FOR CONTROLLING DISSOLVED AMOUNT OF GAS

TECHNICAL FIELD

The present invention relates to a method, a device, and a system for controlling a dissolved amount of gas which can be used in various fields: to dissolve oxygen into water efficiently so as to generate an environment appropriate for animals and plants; to mix high concentration gas dissolving liquid into fluid to be treated and then generate fine air bubbles by reduced pressure foaming so as to perform floatation separation of suspended solids (SS, hereinafter) by means of aggregation between the air bubbles and the SS in the fluid to be treated; fabrication of gas dissolution function water for washing in a semiconductor fabrication process, in which a specific gas component is dissolved; to perform deaeration removal of harmful volatile gas or the like dissolved in liquid (such as factory waste water, underground water, and fish and shellfish nursery water); and to fabricate deaerated water for boiler feed water and ultrasonic cleaning. On the contrary, since high concentration gas dissolving water can be fabricated by dissolving gas such as air and oxygen into liquid to a high concentration, the application of the invention includes: to dissolve oxygen to a high concentration into 3-10% of raw water in an oxygen poor water area and then return and dilute the water into the oxygen poor water area so as to change the water of the oxygen poor water area into water containing a large amount of oxygen and hence appropriate for the ecosystem; water quality improvement in fish and shellfish culture industry, hydroponics industry, or the like; and a gas-liquid reaction in a chemical plant or the like.

BACKGROUND ART

In Japan, techniques for increasing or decreasing the amount of gas dissolved in liquid are divided into gas dissolving techniques and deaeration techniques. Thus, the prior art methods are described separately.

Techniques for dissolving gas include: a method in which an ejector nozzle is attached in a closed tank, and then gas and liquid are mixed under a fixed pressure so as to contact with each other and whereby become dissolved; and a gas dissolving device disclosed in Japanese Published Unexamined Patent Application No. 2003-190750 (Patent Document 1, hereinafter) in which liquid injected from a nozzle collides against a whirl stop arranged in a tank so that the gas is dissolved owing to the pressure of the collision.

Further, in a gas-liquid mixture dissolving device of Japanese Published Unexamined Patent Application No. 2000-161278 (Patent Document 2, hereinafter), disclosed are: a method in which liquid is injected in the form of waterdrops through a nozzle from the upper part of a pressurized tank so that gas is dissolved into the waterdrops; a method in which gas and liquid are mixed in a pressurized tank so as to be dissolved; a method in which a plurality of centrifugal pumps are connected in series so that the pump discharge pressure is increased, so that the gas suction rate is increased, and so that gas and liquid are mixed and dissolved in the centrifugal pumps. Further, a method has been developed in which fine air bubbles are generated directly in liquid so that the contact area of the gas and the liquid is increased, whereby dissolution is achieved.

On the other hand, techniques for deaerating gas include: a vacuum deaeration method in which liquid is sprayed and falls from the upper part of a filler packed in a deaeration column, so that dissolved gas is removed while maintaining the degree of vacuum; and a deaerator disclosed in Japanese Published Unexamined Patent Application No. 2000-325703 (Patent Document 3, hereinafter) in which throttle valves are provided in a pipe on the suction side of a pump and in a tank, and then when the pump operates, the pressure is reduced in the pipe and the tank so that gas dissolved in the liquid is caused to generate bubbles, and then the fluid to be treated is circulated depending on a desired gas recovery rate so that deaeration is achieved.

Nevertheless, the above-mentioned conventional techniques have the following problems.

In the method in which liquid and gas are mixed in a pressurized tank thereby the contact frequency of the liquid and the gas is increased so that dissolution is achieved, energy (pressure and mixture) for dissolution is repeatedly applied even to a liquid portion having already reached a dissolution saturation value under the present pressure. This causes the problem of a remarkable inefficiency that a desired dissolution concentration beyond the saturation value of the dissolution concentration is to be obtained. Further, the method disclosed in Patent Document 1 in which liquid collides against a whirl stop so that gas is dissolved has the problem that the pressure itself generated at the time of collision is not effectively used as energy for dissolving the gas into the liquid, and hence that the gas cannot be dissolved to a high concentration.

Further, in the method in which waterdrops are injected from the upper part of a pressurized tank, the gas is dissolved in proportion to the gas pressure solely in the surface part of the waterdrop, while the gas is not dissolved into the center of the waterdrop. This causes the problem that the dissolution concentration of the treated water cannot be increased efficiently.

The method in which gas and liquid are mixed in a pressurized tank so as to be dissolved has the problem that a large amount of gas is used while continuous operation cannot be performed unless the non-dissolved gas is discharged to the outside of the container, and that the dissolution concentration is low while the economical efficiency is also low.

In the method disclosed in Patent Document 2 in which a plurality of centrifugal pumps are connected in series whereby a high pressure is generated so that the amount of mixed gas is increased so that dissolution is achieved, when the pump discharge pressure is increased, the gas in the pump is compressed and hence the volume becomes small. Thus, a larger amount of gas can obviously be sucked from the suction side of the pump. Nevertheless, mixing a larger amount of gas does not necessarily result in efficient dissolution of the gas. Thus, this causes the problem of a low processing rate and low concentration in spite of the use of a high energy.

Further, in the method in which fine air bubbles are generated directly in liquid, gas dissolution is achieved solely by the effect of an increase in the contact area of the liquid and the gas. Thus, the gas dissolution concentration becomes exceedingly difficult to make it greater than the saturated concentration in the site. Thus, this causes the problem that high concentration gas dissolving liquid is difficult to be obtained.

On the other hand, in the vacuum deaeration method, fluid to be treated is sprayed and falls from the upper part of a tank in a reduced pressure state, so that deaeration is achieved. This method is effective in the case that pure water or the like is to be generated from water having a small amount of mixing of solid foreign substances. Nevertheless, for example, in the case of liquid such as natural environment water and factory waste water having a large amount of mixing of solid foreign substances, the problem arises that clogging frequently occurs in the discharge nozzle and the filler, and hence that the method is not appropriate for continuous operation. Another problem is that the processing rate is low, and hence that a large amount of fluid to be treated cannot be processed. Further, in the invention disclosed in Patent Document 3, even when the fluid to be treated is brought into a reduced pressure state by the suction force in the suction side of the pump, the contact area of the liquid and the gas space is not securely increased, so that the gas dissolved in the fluid to be treated does not efficiently achieve reduced pressure foaming. Thus, unless the fluid to be treated is circulated so that the gas is removed repeatedly in a reduced pressure state, desired deaeration treated fluid cannot be obtained. This causes a problem of a high cost.

The invention has been made in view of these situations in the prior art. An object of the invention is to provide a method, a device, and a system for controlling a dissolved amount of gas in which fluid to be treated introduced into a reduced pressure space or a pressurized space so that successively-generated-and-broken liquid bubbles (an aggregate of air bubbles in the form of soap bubbles) of the fluid to be treated are generated in the space, so that the contact area of the gas and the liquid is increased to a large extent, whereby in the case of a reduced pressure, the gas dissolved in the liquid can be released efficiently, while in the case of pressurization, the gas can be dissolved efficiently into the liquid without a loss so that high concentration gas dissolving liquid can be generated that has a concentration near the pressure-corresponding dissolution concentration given by Henry's law, and in which the effect of gravity is utilized to a maximum extent so that an outstanding energy saving property is realized in the control of the dissolved amount of gas in the liquid.

DISCLOSURE OF THE INVENTION

In the invention, a method for controlling a dissolved amount of gas in the first aspect comprises: a large amount air foam generating step of arranging a container (or containers) having an upward opening in an upper part of a closed tank, then injecting fluid to be treated from an upper part of the container toward an opening center part of the container through a nozzle (or nozzles) for involving (mixing) in a large amount of gas of a surrounding space, and thereby generating a large amount of air bubbles at the bottom part of the container; a liquid foam generating step in which in the container where the air bubbles rise and form a flow from the bottom part along an inner peripheral wall thereof in a manner opposing the flow of the treated fluid, an air bubble group formed by the aggregating and growing of the air bubbles is separated upward from the liquid by an effect of gravity and thereby changes into liquid bubbles (an aggregate of air bubbles in the form of soap bubbles) in an upper region of the container so as to overflow from the container, so that the injected fluid to be treated is converted into liquid thin films (liquid films, hereinafter) of the liquid bubbles; and a dissolved gas amount controlling step capable of extracting gas of the tank so as to generate a space of a reduced pressure (reduced pressure space, hereinafter), then causing the gas dissolved in the liquid films to be released into the liquid bubbles in a reduced pressure state of the inside of the liquid bubbles, and thereby generating deaerated liquid depending on the reduced pressure, or alternatively capable of bringing the inside of the tank into a space of a pressurized state (pressurized space, hereinafter) so as to bring the gas in the liquid bubbles into a compressed state, and thereby generating gas dissolving liquid of a concentration corresponding to the pressure of the gas.

The method for controlling a dissolved amount of gas having this configuration comprises the large amount air foam generating step. Thus, the injected liquid can send a large amount of gas of the upper part of the container to the bottom part of the container. Accordingly, a large amount of air bubbles can be generated at the bottom part of the container. Further, when this operation is continued, the injected liquid collides against the air bubbles rising from the bottom part, so that the air bubbles are pushed back to the bottom part of the container. Thus, the gas space occupation ratio in the container is enhanced. Further, this remarkably reduces the resistance of the liquid injected into the container, so that a small energy can generate a large amount of air bubbles continuously at the bottom part of the container.

Further, since the liquid foam generating step is provided, when the liquid bubbles are generated, the liquid bubbles and the liquid are separated up and down by the effect of gravity and buoyancy. Thus, the liquid films of the liquid bubbles overflowing from the uppermost part of the container are generated at a very small thickness. Further, a large gas space occupation ratio is obtained. Thus, the contact area of the gas space and the liquid is increased remarkably so that the dissolved amount of gas in the treated fluid can be controlled efficiently.

Further, since the dissolved gas amount controlling step is provided, when the gas space in the upper part of the container is brought into a pressurized state depending on a desired concentration, gas dissolving liquid of a desired concentration is obtained. Alternatively, when the gas is extracted so that a reduced pressure space is generated, deaerated liquid in accordance with the degree of reduced pressure is obtained.

A device for controlling a dissolved amount of gas in the second aspect of the invention comprises: a pressure reducing part which is constructed by connecting a hole provided at an upper part of a closed tank to a vacuum pump through a pipe, and which can bring an inside of the tank into a reduced pressure space; an injection supply part for injecting fluid to be treated pressurized by a pressurizing pump from the upper part of the tank through a nozzle for involving in a large amount of gas of the reduced pressure space; a liquid foam generating part which is provided with a container where the injected fluid to be treated is received at the center of the upper opening thereof, then gas of the reduced pressure space is involved in so that a large amount of air bubbles are generated at the bottom part, and then such a flow is formed that an air bubble group rises along an inner peripheral wall thereof in a manner opposing the flow of the fluid to be treated, and in which the air bubble group is separated from the liquid along the peripheral wall of the container and then changes into liquid bubbles in an upper region; a recovery pump part for allowing the liquid bubbles having overflowed from an upper end of the container to fall to a lower part so as to be temporarily stored as deaerated treated fluid, and then recovering the treated fluid; and a tank water level sensor part for transmitting the information for maintaining a water level of the treated fluid stored in the tank to a pump and a valve.

The device for controlling a dissolved amount of gas having the above-mentioned configuration comprises the pressure reducing part. Thus, the gas released from the liquid film in the surface of the liquid bubbles can be released to the outside continuously. At the same time, the reduced pressure space can be maintained in the tank. Alternatively, a gas recovery device may be connected to the pressure reducing part, and thereby recover the gas.

Further, since the injection supply part is provided, a large amount of air bubbles can be generated at the bottom part of the container. Thus, when a large number of air bubbles are generated in the fluid to be treated located in the container under the injection supply, the fluid resistance of the injection from the nozzle into the container is further reduced, so that a large amount of air bubbles can be generated efficiently. Further, since the liquid foam generating part is provided, when a large amount of air bubbles generated at the bottom part of the container to rise along the inner peripheral wall of the container by buoyancy, the air bubbles aggregate and grow. Thus, the liquid bubbles and the liquid are separated up and down by the effect of gravity and buoyancy, while the bubbles change into liquid bubbles successively. Further, when the gas dissolved in the liquid film in the surface of the liquid bubbles is released to the reduced pressure spaces in the liquid bubbles and then the liquid bubbles are overflowed and broken at the uppermost part of the container, the gas is removed from the gas dissolving liquid. Further, since the tank water level sensor part is provided, information on the water level sensed by the sensor is electrically transmitted to the recovery pump and the supply valve (opening and closing only). Thus, the water level is maintained appropriately such that the reduced pressure space in the upper part should not approach the suction opening of the recovery pump in the lower part, and the reduced pressure space is maintained so that the deaeration treated fluid can be recovered stably.

A device for controlling a dissolved amount of gas in the third aspect of the invention comprises: a reduced pressure rise part in which a lower end of a pipe having an opening is immersed into fluid to be treated in a liquid tub, then a pretreatment tank is connected to an upper end of the pipe, then a hole for extracting gas is provided at a position exceeding a height of 10.33 m relative to a liquid level of the liquid tub, and then the hole is connected to a vacuum pump so that a reduced pressure space is generated in the pipe, and which can thereby suck the fluid to be treated to a level of 10 m or the like above the liquid level of the liquid tub so as to cause dissolved gas to form bubbles; an upper liquid foam generating part in which a pipe having an opening is immersed into fluid to be treated in a liquid tub for recovery, then a tank incorporating a container for generating liquid bubbles at a position of approximately 10.6-11.2 m above the liquid level of the liquid tub is connected, and then a hole is provided at an upper part of the tank similarly to the case of the reduced pressure rise part and then connected to the vacuum pump, and in which in a state that the inside of the tank is brought into a reduced pressure space, the fluid to be treated pumped up by the reduced pressure rise part is brought into pressurized fluid by a pump, and then injected into the container so that liquid bubbles are generated; and a self weight recovery part in which since a position of overflow of the liquid bubbles generated in the container is higher than the liquid level of the liquid tub by 10.33 m or more, the treated fluid goes down through the pipe by a self weight according to a water head difference, and thereby can be recovered from the liquid tub for recovery.

The device for controlling a dissolved amount of gas according to the invention comprises the reduced pressure rise part. Thus, in the reduced pressure state in the course that the fluid to be treated rises by approximately 10 m from the liquid level of the liquid tub, the gas dissolved in the fluid to be treated performs foaming so that a pretreatment-like deaeration process is performed. Further, even when a high power vacuum pump is used for improving the degree of vacuum, the fluid to be treated can not be raised higher than 10.33 m. This remarkably simplifies the maintenance and the control of continuous operation, and hence realizes stabile and efficient deaeration. Further, since the upper liquid foam generating part is provided, the somewhat deaerated fluid to be treated is introduced into the reduced pressure space, and thereby brought into a liquid film in the surface of the liquid bubbles where the dissolved gas is easily released. This permits efficient generation of deaeration treated fluid. Further, since the liquid bubbles overflow from a position higher than the water level where the fluid to be treated rises toward the reduced pressure space in the upper part, a fluid volume corresponding to the water head difference can be sent to the downstream by the self weight. Further, since the self weight downward recovery part is provided, the deaerated treated fluid goes down through the pipe by self weight. Further, the recovery port for extracting the treated fluid is arranged at a water level below the water level of the surface of the treated fluid in the lower liquid tub of the reduced pressure rise part. Thus, the treated fluid is easily recovered without the use of power.

In the entire process, gravity is used so that the use of bulb control, sensors, and the like are minimized. Further, continuous operation can stably be performed without the use of complicated control equipment. This provides good controllability. Further, in the case that the gas dissolved in the pumped-up fluid to be treated is a deaeration-difficult gas, the fluid to be treated may be warmed up in advance. Alternatively, a plurality of containers for generating liquid bubbles may be provided in the reduced pressure space in the upper part, so that the liquid foam generating process may be repeated. As such, treated fluid of a high deaeration ratio is obtained.

A device for controlling a dissolved amount of gas in the fourth aspect of the invention comprises: an injection supply part arranged in an upper part of a closed tank and injecting pressurized fluid supplied from a hot water supply machine, a tap water system, or the like in a manner involving in a large amount of gas of a compressed state in the tank; a liquid foam generating container part in which a diameter of an inner cross section of a container arranged in an upper part of the tank and having an upward opening is reduced slightly in an upper part so that an uppermost part has a wide angled opening; and a discharge rate controlling part which is attached downstream of the tank and controls a discharge rate of a solution or alternatively achieves constant rate discharge, and which can thereby control a pressure of the gas of the tank or alternatively maintain a constant pressure.

In the device for controlling a dissolved amount of gas having the above-mentioned configuration, when the stop cock of the hot water supply machine, the tap water system, or the like is merely opened, warm water or chilled water is injected through the nozzle from the injection supply part of the closed tank into the container, so that liquid bubbles overflow and fall from the uppermost part of the container to the lower part of the tank, whereby gas dissolving liquid is stored. Further, when the discharge flow rate is controlled by the valve or the like of the discharge rate controlling part, the gas of the tank can gradually be compressed. Further, when the discharge resistance of the valve or the like is balanced with the injection pressure of the injection supply part, the pressure becomes stable in the tank. Then, high concentration gas dissolving liquid can be generated continuously into which the gas compressed in the upper part of the tank is dissolved to a maximum extent.

Further, since the discharge rate controlling part is provided, the discharge flow rate is controlled so that the pressure of the tank can be maintained constant. Thus, for example, when a shower is provided in the discharge port, since the gas is dissolved at a high concentration, the waterdrops injected from the shower nozzle become waterdrops containing fine air bubbles by reduced pressure foaming. Further, since high concentration gas is still dissolved in the waterdrops, when contacting with the skin, a large amount of fine air bubbles contained in the waterdrops induce foaming of the dissolved gas, so that dirt or the like on the skin is separated and removed.

Further, a fine air bubble generator having a rotationally symmetric shape has been devised in which the liquid is revolved in the inside at a high speed so that a negative pressure axis is formed in the center part. When the liquid dissolving the gas at a high concentration is introduced into the fine air bubble generator, the liquid dissolving the gas at a high concentration approaches the negative pressure axis so that a large amount of gas is released. Thus, a larger amount of fine air bubbles can be generated. Further, the fine air bubble generator has a high flow resistance, and hence has the effect of maintaining the flow rate at constant. Thus, the pressure of the tank is maintained constant, and hence a regulator valve is unnecessary. Accordingly, for example, when the fine air bubble generator is immersed in the hot water of a bathtub of a home and then the stop cock of a hot water supply machine is opened, a large amount of fine air bubbles are generated in the hot water of the bathtub, so that dirt on the skin is removed similarly to the case of the shower waterdrops.

A device for controlling a dissolved amount of gas in the fifth aspect of the invention comprises, in addition to the fourth aspect: a supply valve capable of controlling injection from the injection supply part by manually opening and closing the valve in order to supply new gas when a volume of the space formed by the compressed gas in the upper part of the tank decreases because of the dissolution of the gas; a remaining liquid discharge valve capable of discharging liquid remaining in the tank after the injection is stopped; and a gas supply valve capable of accelerating the discharge of the remaining liquid and supplying the new gas into the tank by supplying the gas from the upper part of the tank.

In the device for controlling a dissolved amount of gas having the above-mentioned configuration, when new gas is to be supplied to the tank, the remaining liquid discharge valve and the gas supply valve are opened after the supply valve is closed. By virtue of this, remaining liquid in the container is discharged, while the new gas is provided into the tank.

Further, in the case of re-operation, after checking that no liquid is being discharged from the remaining liquid discharge valve, the remaining liquid discharge valve and the gas supply valve are closed, and then the supply valve is opened. This simple work achieves the re-operation.

Further, since the water pressure from the hot water supply machine, the tap water, or the like is solely used, necessary maintenance cost is solely a tap water charge. Further, this system is suitable for use in a place without a power supply or a place into which no power supply can be brought (such as a bathroom).

The method for controlling a dissolved amount of gas and the device for controlling a dissolved amount of gas described in the first through fifth aspects given above have the following effects.

(1) In the method for controlling a dissolved amount of gas, the fluid to be treated is brought into a liquid thin film of the form of liquid bubbles in each of the reduced pressure space and the gas compression space. This permits easy discharge and deaeration of the gas dissolved in the fluid to be treated into the reduced pressure space to a maximum extent, or alternatively easy dissolution of the gas into the fluid to be treated to a maximum extent. This realizes high efficiency and high controllability.

(2) When the dissolving operation and the deaeration operation are combined so that, for example, ozone gas is supplied to the tank so that the fluid to be treated is brought into a liquid thin film of the form of liquid bubbles so that the fluid to be treated is brought into high concentration ozone water, processing such as sterilization, deodorization, and decolorization can be performed on the fluid to be treated. Further, when the remaining ozone in the fluid to be treated is then brought into the liquid film in the surface of the liquid bubbles in the reduced pressure space, de-ozonized water is obtained.

(3) The behavior of air bubbles in the liquid, the natural phenomenon of gravity, and the like are utilized to a maximum extent. This minimizes the amount of power consumption. Further, the use of devices such as regulating valves and sensors, is also minimized. This permits easy maintenance and management, and provides good controllability. In the case of large amount processing, no pressurized fluid having a high pressure is necessary. That is, when a plurality of nozzles and containers are arranged in the tank, a large amount of fluids to be treated such as underground water and factory waste water can be processed. This provides high economical efficiency.

A device for controlling a dissolved amount of gas in the sixth aspect of the invention comprises: a pressurized gas-liquid supply part for sucking water to be treated through a suction pipe of a pressurizing pump, then causing the gas to perform self suction from a pore provided in the suction pipe using a negative pressure, and thereby generating pressurized fluid of gas-liquid mixture in a manner controlling a self suction rate; a nozzle part for involving in a large amount of surrounding gas by means of a nozzle for injecting the pressurized fluid via a supply pipe; a liquid foam generating container part in which injection is performed from the center of the upper part of a pressure resisting tank into a container in the pressure resisting tank through the nozzle so that a large amount of air bubbles can be generated in the liquid at the bottom part of the container, and in which the air bubbles rise owing to the buoyancy of the generated air bubbles, then efficiently change into liquid bubbles (bubbles in liquid are referred to as air bubbles hereinafter, while an aggregate of bubbles in the form of soap bubbles is called liquid bubbles) in a diameter reduced region of the upper part of the container, and then overflow so as to be discharged; a dissolution concentration controlling tank part in which the nozzle part and the liquid foam generating container part are incorporated in the upper part of the pressure resisting tank, while a discharge valve is attached downstream of the pressure resisting tank, so that the pressure and the discharge rate of the pressure resisting tank can be controlled; a tank water level sensor part for sensing a water level of gas dissolving water in the pressure resisting tank by means of a sensor such as a float provided in the pressure resisting tank; and a suspended solid discharge port in which when a large amount of suspended solids are mixed in the pressurized gas dissolving water, the pressure of the pressure resisting tank is reduced arbitrarily so that fine air bubbles are generated in the pressure resisting tank, whereby the suspended solids are separated and discharged by floatation separation by adsorption with the air bubbles.

The device for controlling a dissolved amount of gas having the above-mentioned configuration comprises the pressurized gas-liquid supply part and the tank water level sensor part. Then, the water level of the gas dissolving water in the pressure resisting tank is sensed by the sensor such as a float.

Then, for example, when the water level rises, the solenoid valve or the like is operated so as to increase the self suction amount of the gas in order that the amount of gas of the tank should be increased. On the contrary, when the water level falls, the solenoid valve or the like is operated so as to reduce the self suction amount of the gas in order that the amount of gas of the tank should be reduced. This operation maintains the water level at a desired level. This prevents that the gas having been self sucked but not dissolved is discharged from the discharge valve in the downstream. Thus, the gas is dissolved without a loss. Further, continuous operation can be performed stably at each pressure.

Further, when the supply pipe before the nozzle injection opening is bent at right angles, disturbance occurs in the flow through the supply pipe. Thus, the injection opening in the shape of merely a circular hole causes the injected liquid to spread slightly, and thereby serves as an injection nozzle for involving in a large amount of surrounding gas. Thus, when injection is performed from the center of the upper part of the liquid foam generating container into the liquid foam generating container, a large amount of air bubbles can be generated at the bottom part of the container. Further, in continuous injection, approximately half of the volume of the liquid foam generating container can be a gas portion of the air bubbles and the liquid bubbles. Further, since the supply pipe is bent before the nozzle injection opening, the injection opening can be implemented by a non-complicated structure of a circular hole. This avoids a possible decrease in the injection force, and prevents the clogging of dust.

Further, since the liquid foam generating container part is provided, a large amount of air bubbles generated at the bottom part of the liquid foam generating container rise as a result of buoyancy. Then, the liquid and the air bubbles separate up and down by the effect of gravity. In the lower part of the diameter reduced part of the upper part of the container, the air bubbles occupy a major part, while the rising air bubbles aggregate and form liquid bubbles. Thus, in the vicinity of the diameter reduced part and at the edge of the upper end of the container, complete liquid bubbles of a diameter of approximately 5-15 mm are generated efficiently. As a result, the injected liquid becomes the surface water of the liquid bubbles at least once, and thereby is overflowed and discharged from the liquid foam generating container.

Further, since the dissolution concentration controlling tank part is provided, the discharge valve can control the gas pressure of the pressure resisting tank, so that a desired gas dissolution concentration proportional to the gas pressure is obtained in the surface water of the liquid bubbles.

Further, since the suspended solid discharge port is provided, suspended solids are removed from the gas dissolving water, so that clean gas dissolving water having a reduced amount of suspended solids is obtained from the discharge valve although the dissolution concentration is reduced.

The following effects are obtained in the device for controlling a dissolved amount of gas described in the sixth aspect given above.

(1) The supplied treated fluid becomes the surface water of the liquid bubbles at least once. Thus, dissolution is achieved at a value proportional to the pressure of the gas of the pressure resisting tank. Accordingly, a desired gas dissolution concentration near the dissolution concentration according to Henry's law is achieved at each pressure. Further, the water level of the pressure resisting tank is maintained by virtue of the tank water level sensor. Thus, the gas is dissolved without a loss, while continuous operation can be performed stably. This realizes high efficiency and high controllability.

(2) Even when the discharge valve is fully opened so that pressure of the pressure resisting tank is brought into the atmospheric pressure, high concentration oxygen dissolving water is obtained. Thus, when carbon dioxide which is more dissoluble is dissolved into seawater and then transported to deep sea via a pipe or the like so that carbon dioxide is reduced on land, the device according to the invention can be utilized for global warming prevention.

(3) For example, when 100 t of water having a dissolved oxygen (DO) of 4 ppm is diluted with 3 t of water having a DO of 150 ppm, a DO of 8.25 ppm is obtained. As such, water in a fish and shellfish nursery, a hydroponics farm, or the like can be brought into suitable water containing much oxygen. As such, the device according to the invention has a wide utilization range and high versatility.

(4) In the case that a large amount of suspended solids are contained in the pressurized gas dissolving water, when the pressure is reduced in the pressure resisting tank, reduced pressure foaming is performed on the dissolved gas. Then, fine air bubbles are generated and then adhere to the suspended solids. Thus, the suspended solids are floated and discharged. As such, clean gas dissolving water having a reduced amount of suspended solids is obtained although the gas dissolution concentration is reduced.

Lastly, a system for controlling a dissolved amount of gas in the seventh aspect of the invention comprises: a static pressure water supply part in which in a place such as the sea and a dammed lake having a certain water depth (a water depth of 30 m or more is desirable), a strainer and a static pressure water valve are attached to the supply pipe portion of a device for controlling a dissolved amount of gas according to the sixth aspect noted above, and then the pressure of the pressure resisting tank is reduced so that the static pressure water of the water depth can be injected from the nozzle, and in which a reversing valve is attached to the nozzle part so that reverse washing can be performed; a tank pressure controlling part in which a hole is provided at the upper part of the pressure resisting tank, then a gas inlet and outlet valve for discharging and injecting the gas of the pressure resisting tank is attached to the hole and then connected through a pressure resisting the gas hose or the like to each of gas storage tanks arranged respectively on a gas suction side and a gas feed side of a compressor located on a water surface, and then valves are attached, and in which when the part is operated, the gas pressure of the pressure resisting tank located in the place having a certain water depth can be controlled; and a control part for operating all valves by means of solenoid valves by using sensors for sensing a full water level and a low water level of the gas dissolving water in the pressure resisting tank and sensors for sensing the pressure of the gas storage tank and the like.

The system for controlling a dissolved amount of gas having the above-mentioned configuration comprises the static pressure water supply part. Thus, when the pressure of the pressure resisting tank is reduced to a desired extent relative to the static pressure of the surrounding water depth and then the static pressure water valve is opened, the static pressure water serves as the pressure water. Thus, the static pressure water can be injected from the nozzle into the pressure resisting tank via the supply pipe from the strainer attached outside.

Further, since the reversing valve is provided in the nozzle part, even in the case that dust is adhered to the nozzle part or a part of the strainer, when the discharge valve is closed while the static pressure water valve is opened and then pressurized gas is sent from the compressor on the water surface after, the pressurized gas first flows from the nozzle discharge opening toward the strainer, and thereby washes the nozzle discharge opening. After that, when the reversing valve is opened with a slight time lag, a large amount of pressurized gas flows from the reversing valve toward the strainer, so that the dust adhered to the strainer is removed.

Further, since the tank pressure controlling part is provided, when the full water level sensor senses the time that the gas dissolving water has filled the pressure resisting tank to a desired water level, the static pressure water valve is closed while the discharge valve and the gas inlet and outlet valve are opened. Further, pressurized gas having a pressure higher than the static pressure of the surrounding water depth is sent into the pressure resisting tank from the gas pressure storage tank on the compressor feed side arranged on the water surface. As a result, gas dissolving water can be discharged from the discharge valve to the environment under the water depth static pressure.

When the low water level sensor senses the time that a desired amount of gas dissolving water has been discharged from the pressure resisting tank, the discharge valve and the gas pressure storage tank valve on the compressor feed side on the water surface are closed, while the gas reduced pressure storage tank valve on the compressor suction side is opened so that the gas of the pressure resisting tank is extracted. When the pressure is reduced to a desired level, the gas inlet and outlet valve is closed, while the static pressure water valve is re-opened. As a result, static pressure water can be injected into the pressure resisting tank. When this process is repeated, the static pressure water can be brought into liquid bubbles, so that gas dissolving water of a concentration proportional to the pressurized gas of the pressure resisting tank can be discharged.

Further, since the control part is provided, the information from the sensor inside the pressure resisting tank located in the place having a certain water depth static pressure and the information from the sensors in the compressor, the gas storage tank, and the like located on the water surface are controlled and transmitted to various kinds of solenoid valves and the like, so that operation is performed.

The power does not need a pump, while the gas suction force and the gas feed force of the compressor and the water depth static pressure are used. Thus, operation is achieved without the use of a device such as a motor employing a revolving shaft which could cause a failure in the place having a certain water depth static pressure. Further, the gas is dissolved into the water at the water depth. Thus, gas dissolving water of the same water temperature can be discharged into that water depth region.

The following effects are obtained in the system for controlling a dissolved amount of gas described in the seventh aspect given above.

(1) The gas suction force and the compression force of the compressor is used as the source of power of gas dissolution. Thus, operation is achieved merely by opening and closing the valves at respective places. This provides good operability and controllability. Further, the pressurized gas energy after the dissolving process is recycled efficiently. This enhances energy saving.

(2) In a lake bottom region having a low water temperature in a lake, a dammed lake, or the like, oxygen is dissolved at a high concentration into the static pressure water of the water area, so that the discharged water has almost the same water temperature. Thus, the oxygen dissolving water is prevented from rising from the place of discharge, and hence settled there. This avoids loss, and hence has high efficiency and good economy.

This suppresses the elution of nutritive salts such as nitrogen and phosphorus as well as iron and manganese from the bottom sediment, and hence suppresses toxic gas generating from the bottom sediment.

Further, when the bottom sediment is maintained in an aerobic state, microorganisms are activated so that the purification of the bottom sediment is advanced while the bottom sediment environment is improved efficiently.

(3) In the ocean, when seawater in which oxygen has been dissolved at a high concentration is released and diluted into an oxygen poor water area of a place having a certain water depth, the seawater is brought in that contains much oxygen and is suitable for the ecosystem. This improves the survival probability and the growth rate in fishes and shellfishes in a nursery or the like, and hence increases fishery income.

BRIEF DESCRIPTION OF THE DRAWINGS

FIG. 9 shows an example of an experiment in which in a device for controlling a dissolved amount of gas according to Embodiment 4, tap water is used as treated water while air and pure oxygen are used as gas, and in which in a state that each gas fills a pressure resisting tank, the pressure of the pressure resisting tank is varied and then the dissolved oxygen concentration (DO) is measured.

FIG. 10 is a front view showing the situation that a liquid foam generation gas dissolving device according to Embodiment 5 of the invention is arranged in a lake or the like.

BEST MODE FOR CARRYING OUT THE INVENTION

Embodiments of a method, a device, and a system for controlling a dissolved amount of gas according to the invention are described below with reference to FIG. 1 through FIG. 10.

Embodiment 1

A device for controlling a dissolved amount of gas according to Embodiment 1 relevant to a method for controlling a dissolved amount of gas according to the first aspect of the invention and a device for controlling a dissolved amount of gas according to the second aspect is described below with reference to the drawings.

Figure 1:
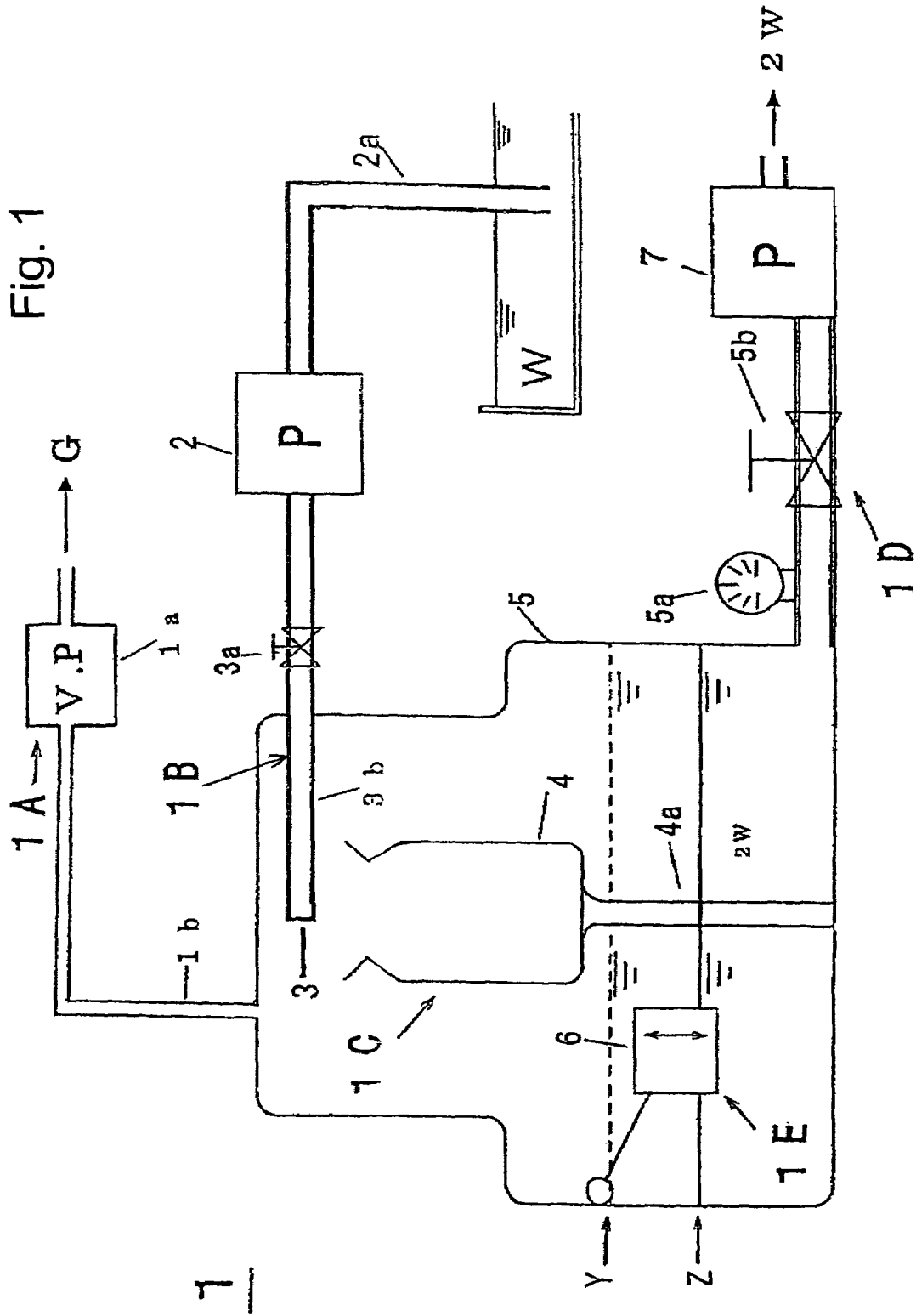
FIG. 1 is a front view of a device for controlling a dissolved amount of gas according to Embodiment 1 of the invention.
Figure 2:
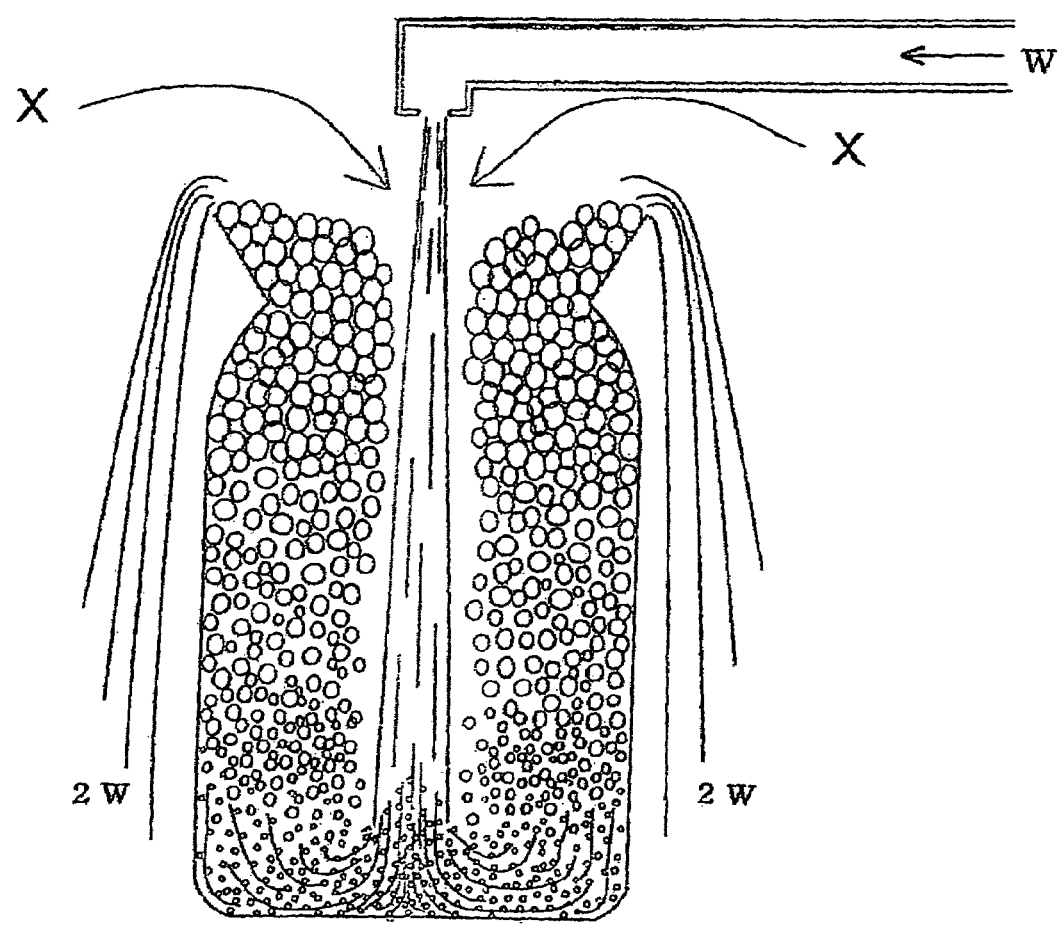
FIG. 2 is a schematic diagram showing the situation that a treated fluid W injected from a nozzle involves in a large amount of surrounding gas X and thereby generates a large amount of air bubbles at a central bottom part of a liquid foam generating container, so that a large amount of air bubbles rise from a bottom peripheral wall of the container by an effect of buoyancy and aggregate and thereby grow rapidly, so that the air bubbles are separated upward from the liquid by an effect of gravity, then change into liquid bubbles in the vicinity of an upper part of a diameter reduced region of the container, and then overflow from the container.
Figure 3:
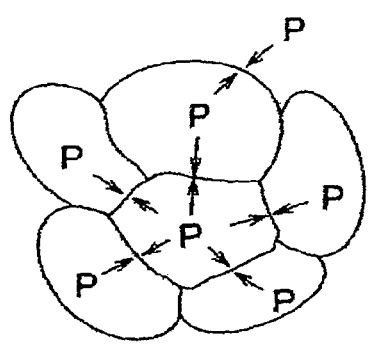
FIG. 3(A) is a schematic diagram showing the situation that in the case of gas of a state that a space in a liquid bubble is compressed, the gas of an amount proportional to the pressure dissolves instantaneously into a liquid film (liquid thin film WF) in the surface of a liquid bubble.
FIG. 3(B) is a schematic diagram showing the situation that gas dissolved in a liquid film (liquid thin film WF) in the surface of a liquid bubble is released instantaneously to a reduced pressure space.
Figure 3:
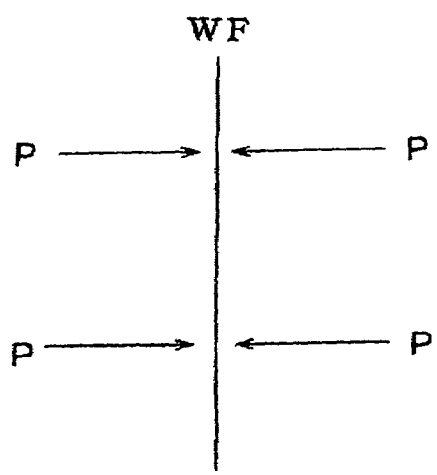
Figure 3:
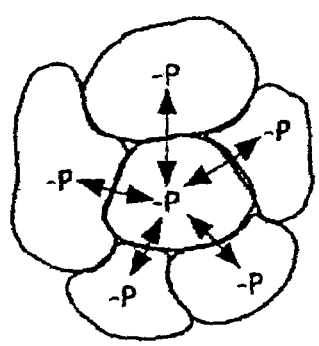
Figure 3:
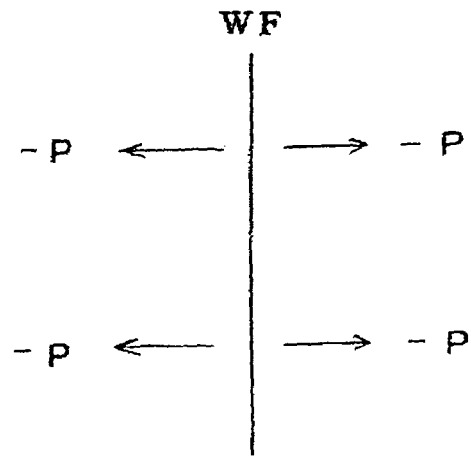

FIG. 1 is a front view of a device for controlling a dissolved amount of gas according to Embodiment 1 of the invention. FIG. 2 is a schematic diagram showing the situation that a treated fluid W injected from a nozzle involves in a large amount of surrounding gas X and thereby generates a large amount of air bubbles at a central bottom part of a liquid foam generating container, so that a large amount of air bubbles rise from a bottom peripheral wall of the container by an effect of buoyancy and aggregate and thereby grow rapidly, so that the air bubbles are separated upward from the liquid by an effect of gravity, then change into liquid bubbles in the vicinity of an upper part of a diameter reduced region of the container, and then overflow from the container. FIG. 3(A) is a schematic diagram showing the situation that in the case of gas of a state that a space in a liquid bubble is compressed, the gas of an amount proportional to the pressure dissolves instantaneously into a liquid film (liquid thin film WF) in the surface of a liquid bubble. FIG. 3(B) is a schematic diagram showing the situation that gas dissolved in a liquid film (liquid thin film WF) in the surface of a liquid bubble is released instantaneously to a reduced pressure space.

In FIG. 1, numeral 1 indicates a device for controlling a dissolved amount of gas according to Embodiment 1. Numeral 1A indicates a pressure reducing part for extracting the gas of the tank and thereby generating a reduced pressure space. Numeral 1B indicates an injection supply part in which treated fluid W is sucked, then the pressurized treated fluid W undergoes rapid passage change in a supply pipe tip part so that a jet stream is generated immediately before a nozzle injection opening, so that a large amount of gas of a surrounding reduced pressure space is involved in. Numeral 1C indicates a liquid foam generating part for generating a large amount of air bubbles at the bottom part of a container and causing the bubbles to change into liquid bubbles in the vicinity of a diameter reduced upper region. Numeral 1D indicates a recovery pump part for recovering deaerated liquid stored at the lower part of the tank. Numeral 1E indicates a tank water level sensor part in which the water level of the deaeration treated fluid of the lower part of the tank is sensed by a sensor, and then transmitted to the recovery pump and the supply valve such that the water level of the treated fluid in the tank should be maintained.

Numeral 1a indicates a vacuum pump for extracting the gas from the tank and thereby generating a reduced pressure space. Numeral 1b indicates a decompression sucking pipe connected between a hole in the upper part of the tank and the vacuum pump 1a. Numeral 2 indicates a pressurizing pump for sucking the water W to be treated (hereafter also referred to as "water under treatment W") and thereby generating pressurized fluid. Numeral 2a indicates a suction pipe connected to the suction side of the pressurizing pump 2 and sucking the water to be treated W. Numeral 3 indicates a nozzle in which in order that a disturbance should occur in the flow of liquid in a supply pipe 3b immediately before the injection and that the injection liquid should involve in a large amount of gas of the surrounding space, rapid passage change is caused in the supply pipe 3b tip part immediately before the injection, while an injection opening is provided at a bottom of the supply pipe 3b immediately before the injection. Numeral 3a indicates a supply valve which is attached to a supply pipe 3b for supplying pressurized fluid generated by the pressurizing pump 2, and which operates in a full open state or a full closed state. Numeral 4 indicates a liquid foam generating container in which the injection liquid having involved in a large amount of gas of the surrounding reduced pressure space is received at the center of a container, so that a large amount of air bubbles are generated at the bottom part, and then using the floatation and aggregating of the air bubbles, the air bubbles are changed into liquid bubbles and then overflowed at the upper region of the container. Numeral 4a indicates a support rod for fixing and supporting the liquid foam generating container 4. Numeral 5 indicates a tank incorporating the nozzle 3 and the liquid foam generating container 4 in the upper part and capable of temporarily storing as the treated fluid the liquid bubbles having overflowed from the liquid foam generating container 4. Numeral 5a indicates a pressure gauge sensor for measuring the pressure of the tank 5. Numeral 5b indicates a recovery regulator valve for controlling the recovery rate on the basis of electrical information from a tank water level sensor. Numeral 6 indicates a tank water level sensor for sensing the upper limit water level Y and the lower limit water level Z of the treated fluid in the tank 5. Numeral 7 indicates a recovery pump for sucking and recovering the treated fluid stored in the tank. Symbol G indicates deaerated gas. Symbol W indicates fluid to be treated (hereafter also referred to as "fluid under treatment"). Symbol 2W indicates deaerated treated fluid. An electric wiring diagram and a control panel are omitted here.

The operating method is described below for the device 1 for controlling a dissolved amount of gas according to Embodiment 1 having the above-mentioned configuration.

First, the supply valve 3a and the recovery regulator valve 5b are closed. Then, the vacuum pump 1a is operated, so that a reduced pressure space depending on the capability of the vacuum pump 1a is generated in the tank 5. Then, the pressurizing pump 2 is operated while the supply valve 3a is opened, so that the fluid under treatment W is injected from the nozzle 3 arranged in the upper part of the tank. At that time, the fluid under treatment W involves in a large amount of gas of the surrounding reduced pressure space, and is injected toward the center of the liquid foam generating container 4.

As a result, as shown in FIG. 2, a large amount of air bubbles are generated at the bottom part of the liquid foam generating container 4, so that the air bubbles rise by the effect of buoyancy, and aggregate and grow at that time. The liquid around the air bubbles go down by the effect of gravity, then change from the air bubbles to liquid bubbles in the vicinity of the diameter reduced region of the upper part of the liquid foam generating container 4, and then overflow in the state of liquid bubbles from the edge of the upper end of the liquid foam generating container 4.

Thus, the fluid to be treated W injected from the nozzle 3 becomes eventually a liquid film in the surface of the liquid bubbles, so that the dissolved gas is released instantaneously to the reduced pressure space. The liquid bubbles overflow as the treated fluid 2W, and are stored at the lower part of the tank 5.

At the time that the tank water level sensor 6 has sensed the upper limit water level Y of the treated fluid 2W in the tank 5, the recovery pump 7 is operated first. Then, the recovery regulator valve 5b is opened immediately after that. As a result, the deaerated treated fluid 2W is recovered from the recovery pump discharge side.

Further, in continuous operation, in order that the level of the treated fluid 2W stored in the tank should remain between the upper limit water level Y and the lower limit water level Z, information of the tank water level sensor 6 is transmitted electrically to the supply valve 3a (opening and closing only), the recovery regulator valve 5b, and the recovery pump 7, so that the water level is controlled. This permits stable operation.

Here, the position of the upper limit water level Y need not be much lower than the upper end of the liquid foam generating container, as long as the injection liquid from the nozzle can involve in a large amount of gas of the surrounding reduced pressure space so that air bubbles can be generated at the bottom part of the container and then the liquid can overflow from the upper end. Further, the position of the lower limit water level Z may be such that the treated fluid 2W discharged at the time of operation of the recovery pump 7 does not contain air bubbles, and that the recovery pump 7 does not suck the gas of the reduced pressure space in the upper part.

The device for controlling a dissolved amount of gas according to Embodiment 1 is constructed as described above, and hence has the following effects.

Since the supply valve 3a and the recovery regulator valve 5b are provided, the inside of the tank 5 can be brought into a reduced pressure state depending on the capability of the vacuum pump 1a, at the time of initial operation. Further, in continuous operation, since the information of the tank water level sensor 6 is transmitted, the supply valve 3a (opening and closing only) and the recovery pump 7 can control the recovery rate of the treated fluid 2W. Thus, the water level of the treated fluid 2W in the tank 5 can be maintained at a desired position. This permits a stable continuous operation.

A gas recovery device can easily be connected to the vacuum pump 1a. Then, the deaerated gas is also recovered.

Since the nozzle 3 and the liquid foam generating container 4 are provided, in the liquid bubble surface where the interior of the liquid bubbles is a reduced pressure space, the provided fluid to be treated W can be brought into a liquid film. Then, the gas dissolved in the liquid film is released to the reduced pressure space, so that desired deaeration liquid is obtained.

Embodiment 2

A device for controlling a dissolved amount of gas relevant to a method for controlling a dissolved amount of gas according to the first aspect of the invention and a device for controlling a dissolved amount of gas according to the third aspect is described below with reference to the drawings.

Figure 4:
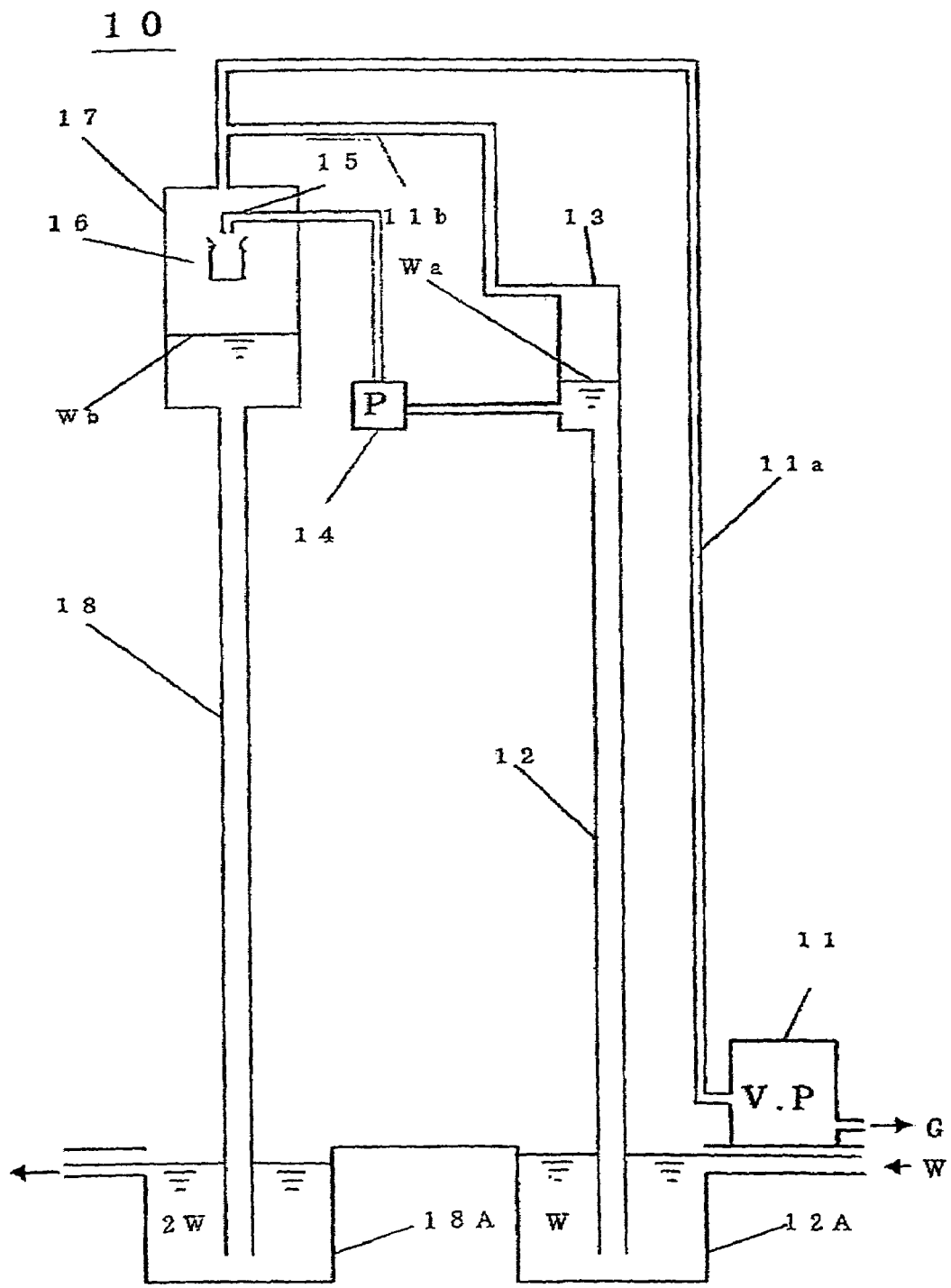
FIG. 4 is a front view of a device for controlling a dissolved amount of gas according to Embodiment 2.

FIG. 4 is a front view of a device for controlling a dissolved amount of gas according to Embodiment 2 of the invention. In comparison with Japanese Published Unexamined Patent Application No. 2003-126884 "Water Treatment Device and Water Treatment Process" filed by the present applicant, the method is almost the same in the point that fluid to be treated is raised upward by approximately 10 m by using a vacuum pump or the like so that a reduced pressure space is generated over the fluid to be treated. However, a large difference is that the deaeration process is performed in the reduced pressure space onto a liquid film in the surface of the liquid bubbles where the gas dissolved in the fluid to be treated is easiest to be released. Another large difference is that no power is used in recovering the treated fluid, that is, the recovery process is performed by a water head difference.

In FIG. 4, numeral 10 indicates a device for controlling a dissolved amount of gas according to Embodiment 2. Numeral 11 indicates a vacuum pump for performing deaeration from the upper part of the device 10 for controlling a dissolved amount of gas through decompression sucking pipes 11a and 11b, and reducing the pressure in the device 10 for controlling a dissolved amount of gas. Numeral 12 indicates a rise pipe through which the fluid to be treated W rises from the fluid tub 12A when the pressure of the upper part is reduced. Numeral 13 indicates a pretreatment tank in which the liquid level Wa of the fluid to be treated raised depending on the capability of the vacuum pump rises to a position at a maximum 10.33 m or lower. Numeral 14 indicates an upper pressurizing pump for sucking and pressurizing the fluid to be treated having risen. Numeral 15 indicates an upper nozzle for injecting the pressurized fluid to be treated in a manner involving (mixing) in a large amount of gas of the surrounding reduced pressure space. Numeral 16 indicates an upper liquid foam generating container arranged under the upper nozzle, generating a large amount of air bubbles at the bottom part of the container, and causing the bubbles to change into liquid bubbles by buoyancy. Numeral 17 indicates an upper tank which incorporates the upper nozzle 15 and the upper liquid foam generating container 16 in the upper part, and in which the treated fluid 2W having overflowed from the upper liquid foam generating container 16 is stored temporarily. Numeral 18 indicates a downward pipe through which the treated fluid 2W goes down owing to the water head difference between the liquid level Wb of the treated fluid 2W stored temporarily in the upper tank 17 and the liquid level Wa of the fluid to be treated W. Numeral 18A indicates a recovery tub for recovering the treated fluid 2W having gone down. Symbol G indicates deaerated gas.

The operating method is described below for the device 10 for controlling a dissolved amount of gas according to Embodiment 1 having the above-mentioned configuration.

First, the fluid tub 12A and the recovery tub 18A are filled with the fluid to be treated W. Then, with maintaining the water level, the vacuum pump 11 is operated so that the gas of the pretreatment tank 13 and the upper tank 17 is extracted via the decompression sucking pipes 11a and 11b. As a result, the rise pipe 12 and the downward pipe 18 are brought into a reduced pressure state, so that the fluid to be treated W in the fluid tub 12A and the recovery tub 18A rises through both pipes.

At the time that the fluid to be treated W rises into the pretreatment tank 13 and then reaches the liquid level Wa depending on the degree of reduced pressure, the upper pressurizing pump 14 is operated so that the fluid to be treated W is injected from the upper nozzle 15 toward the center of the upper liquid foam generating container 16. As a result, a large amount of gas of the reduced pressure space in the upper tank 17 is involved in so that a large amount of air bubbles are generated at the bottom part of the upper liquid foam generating container 16. The air bubbles rise as a result of buoyancy, then aggregate and grow, then change into liquid bubbles, and then overflow from the uppermost part of the upper liquid foam generating container 16 so as to be stored downstream of the upper tank 17. Then, the treated fluid 2W goes down from the downward pipe 18 owing to the water head difference between the liquid level Wb and the liquid level Wa and by the self weight, and then flows into the recovery tub 18A.

At that time, the amount of the fluid to be treated W sucked from the pretreatment tank 13 by the upper pressurizing pump 14 is balanced with the amount of the fluid to be treated W raised from the fluid tub 12A through the rise pipe 12 by the effect of the reduced pressure state of the pretreatment tank 13, so that the liquid level Wa is maintained.

It should be noted that the liquid in the downward pipe 18 and the upper tank 17 at the time of initial operation is the fluid to be treated W. Thus, the liquid in the recovery tub 18A is returned to the fluid tub 12A by the pump or the like until deaerated treated fluid 2W is obtained.

The device 10 for controlling a dissolved amount of gas according to Embodiment 2 is constructed as described above, and hence has the following effects.

The operation is performed in a state that the liquid is continuously supplied to the fluid tub 12A and the recovery tub 18A, and that the ends of both pipes are immersed into the liquid. This avoids the possibility that gas is sucked and mixed from the outside of the device. Further, the fluid to be treated can be raised in the inside of the pretreatment tank to a height maximum of 10.33 m or lower from the surface liquid of the liquid tub. Thus, even when a high power vacuum pump is used, output control is unnecessary, that is, the operation may be performed at full power so that a strong reduced pressure space can be maintained in the upper part. This realizes high efficiency and high controllability.

As for the liquid in the rise pipe 12 and the downward pipe 18, since the upper space is in a reduced pressure state, even in the course of the rise of the liquid, a certain amount of dissolved gas can be removed.

Further, even when air bubbles are contained in the treated fluid after the liquid foam generating process, the liquid rises toward the reduced pressure space in the upper part, and hence the gas can be removed.

In a pressurized state of FIG. 4, the liquid level Wa is in a static equilibrium state, and hence in a stationary state. Thus, depending on the water head difference between the liquid level Wa and the liquid level Wb, the treated fluid 2W goes down by the self weight through the downward pipe 18, so that the treated fluid 2W is recovered from the recovery tub 18A without the use of power.

In the case of fluid to be treated W containing a deaeration-difficult gas, a plurality of upper tanks 17 may be arranged so that the fluid to be treated may be brought into the state of a liquid bubble film repeatedly. This achieves deaeration.

Alternatively, a heater or the like may be used to warm the fluid to be treated W at a region between the fluid tub 12A and the pretreatment tank 13. This increase in the liquid temperature improves the deaeration rate.

Embodiment 3

A device for controlling a dissolved amount of gas according to Embodiment 3 relevant to a method for controlling a dissolved amount of gas according to the first aspect of the invention and a device for controlling a dissolved amount of gas according to the fourth and fifth aspect is described below with reference to the drawings.

Figure 5:
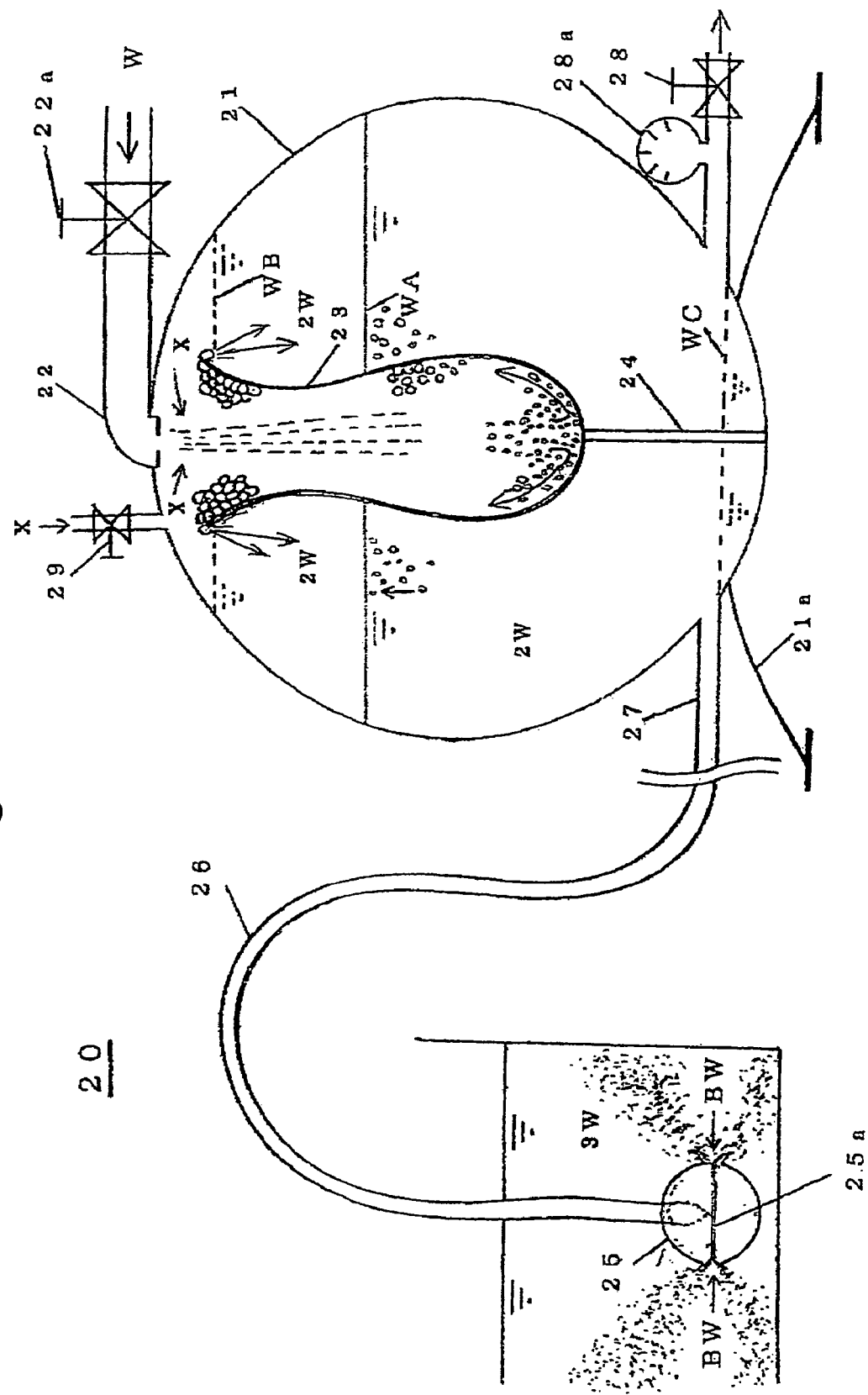
FIG. 5 is a front view of a device for controlling a dissolved amount of gas according to Embodiment 3.

FIG. 5 is a front view of a device for controlling a dissolved amount of gas according to Embodiment 3 of the invention.

In FIG. 5, numeral 20 indicates a device for controlling a dissolved amount of gas according to Embodiment 3. Numeral 21 indicates a pressure resisting tank capable of bearing the tap water pressure. Numeral 21a indicates a base for stabilizing the tank 21. Numeral 22 indicates a nozzle for involving in a large amount of gas of a gas space X in the tank when pressurized fluid is injected from a hot water supply machine or a tap water system. Numeral 22a indicates a supply valve capable of controlling the supply of the pressurized fluid sent to the nozzle 22. Numeral 23 indicates a container arranged in the upper part of the tank 21 and receiving injected liquid from the nozzle 22. Numeral 24 indicates a support rod for fixing the container 23. Numeral 25 indicates a discharge rate regulator in which when the liquid bubbles having overflowed from the container 23 is stored as liquid at the tank 21 lower part, a resistor (as such a revolution type fine air bubble generator shown in FIG. 5) for achieving a fixed discharge rate is attached via a discharge port 27 having an opening at the tank lower part and a hose 26, or alternatively a discharge rate is controlled with operating a valve or the like and watching a pressure gauge 28a, so that a desired pressure can be achieved in the tank 21 while the water level WA can be maintained. Numeral 25a indicates a negative pressure revolving axis in which in a fine air bubble generator having a rotationally symmetric shape, when pressure water is supplied in a direction tangential to the wall phase, the supplied liquid is revolved and discharged in a revolved state through holes in the right and left positions, so that the negative pressure revolving axis is generated on the center line of the revolution by a centripetal force. Numeral 28 indicates a remaining liquid discharge valve for discharging liquid remaining in the tank 21. Numeral 29 indicates a gas supply valve capable of supplying new gas into the tank 21 and discharging rapidly the remaining liquid in the tank 21 to an extent that a water level WC is reached. Numeral 3W indicates cloudy liquid. Symbol BW indicates surrounding liquid attracted to the negative pressure revolving axis 25a.

The operating method is described below for the device 20 for controlling a dissolved amount of gas according to Embodiment 3 having the above-mentioned configuration.

First, in a state that the liquid is not discharged, the water level of the tank 21 should be at a position WC. Thus, after the gas supply valve 29 and the remaining liquid discharge valve 28 are opened, the situation is checked. After that, the remaining liquid discharge valve 28 and the gas supply valve 29 are closed. Then, the supply valve 22a is opened. As a result, the pressurized fluid W supplied from a hot water supply machine or a tap water is injected from the nozzle 22 toward the center of the container 23 in a manner involving in a large amount of gas X which is the compressed surrounding gas. Thus, a large amount of air bubbles are generated at the bottom part of the container 23, so that the air bubbles rise from a bottom peripheral wall of the container 23 by the effect of buoyancy and aggregate and grow. In the upper region of the container 23, the bubbles change into liquid bubbles, then overflow from the container 23, and then are stored as the treated fluid 2W into which the gas is dissolved, in the downstream of the tank 21. The rate that the stored treated fluid 2W is discharged to the outside from the tank 21 can be set up by the discharge resistance of the discharge rate regulator 25 attached from the tank 21 lower part via the discharge port 27 and the hose 26. At the same time, the pressure and the water level WA of the tank 21 are also set up. When the operation is continued in this state, the compressed gas in the upper part of the tank 21 is dissolved slowly, so that the volume of the gas space is reduced. When the water level approaches WB, the supply valve 22a is closed while the gas supply valve 29 and the remaining liquid discharge valve 28 are opened so that the liquid is discharged to the liquid level WC. As a result, new gas is introduced so that the operation is repeated.

Example of Embodiment 3

The tank 21 was constructed by welding into a sphere two hemispheres having an inner diameter of 36 cm composed of stainless steel. The discharge opening of the nozzle 22 portion had a diameter of 6 mm and arranged at an upper part of the tank 21. The container 23 was constructed from a cylinder having a height of 30 cm and an inner diameter of approximately 10 cm. Thus, its volume was approximately 2.2 liters. Further, a portion having a somewhat reduced diameter was fabricated in the upper part, while the diameter of the uppermost part was expanded. The distance from the upper end of the container 23 to the nozzle 22 was fixed at 4 cm. The apparatus fabricated as described here was operated.

The fine air bubble generator 25 of the form shown in FIG. 5 was used as the discharge rate regulator, while the discharge port on each of the right and left sides had a diameter of 5 mm.

The pressurized fluid W was composed of water directly supplied from a tap water system, and injected from the nozzle 22. The supply valve 22*a* was implemented by a stop cock itself of the tap water.

The water pressure of the fluid to be treated W under injection was 0.27 MPa. At that time, the pressure of the tank was maintained at 0.18 MPa. The treated fluid 2W was discharged from the fine air bubble generator at 16.5 liters per minute.

When the fine air bubble generator is operated in a state immersed into a bathtub at the full water level of approximately 240 liters, the inside of the bathtub was maintained in a milk-like cloudy state continuously for approximately 16 minutes.

The device 20 for controlling a dissolved amount of gas according to Embodiment 3 is constructed as described above, and hence has the following effects.

No power supply is necessary, that is, the device can be operated manually by using a water pressure on the order of that of the tap water. Thus, this device is remarkably suitable for use in a place without a power supply or a place into which no power supply can be brought.

For example, when the nozzle part of an ordinary shower provided in a home is removed, and then connected to the supply valve 22*a* portion, and when the discharge rate regulator 25 is merely attached to the fine air bubble generator, as shown in FIG. 5, a large amount of micro bubbles are generated in the bathtub, so that the inside of the bathtub is maintained in a milk-like cloudy state during the operation.

Here, even in an area where the water pressure is low, similar operation is achieved when a pressurizing pump is connected to the water pipe so that the pressurized water is supplied to the hot water supply machine.

In the case that this device for controlling a dissolved amount of gas is used in a state that circulation is performed by a pump, the gas can be supplied into the tank 21 by using the negative pressure on the suction side of the pump. Thus, the outlet of the remaining liquid discharge valve 28 is connected to the inlet of the gas supply valve 29 through a duct. Then, a float sensor is attached to the duct, so that the water level of the tank 21 is sensed. Then, the information is transmitted to the suction side of the pump so that the gas supply rate is controlled, whereby the water level of the tank 21 can be controlled to a desired level. This permits stable long-term continuous operation.

Further, when the water level of the tank 21 is sensed, and when the supply valve 22*a*, the remaining liquid discharge valve 28, and the gas supply valve 29 are composed of solenoid valves, the information of the water level can be transmitted to the solenoid valves so that the valves can be operated accordingly. Thus, even when no pump is used, the operation can be achieved using the tap water pressure and the water head pressure when the gas is supplied, although it may be intermittent.

Embodiment 4

A device for controlling a dissolved amount of gas according to Embodiment 4 of the invention is described below with reference to the drawings.

Figure 6:
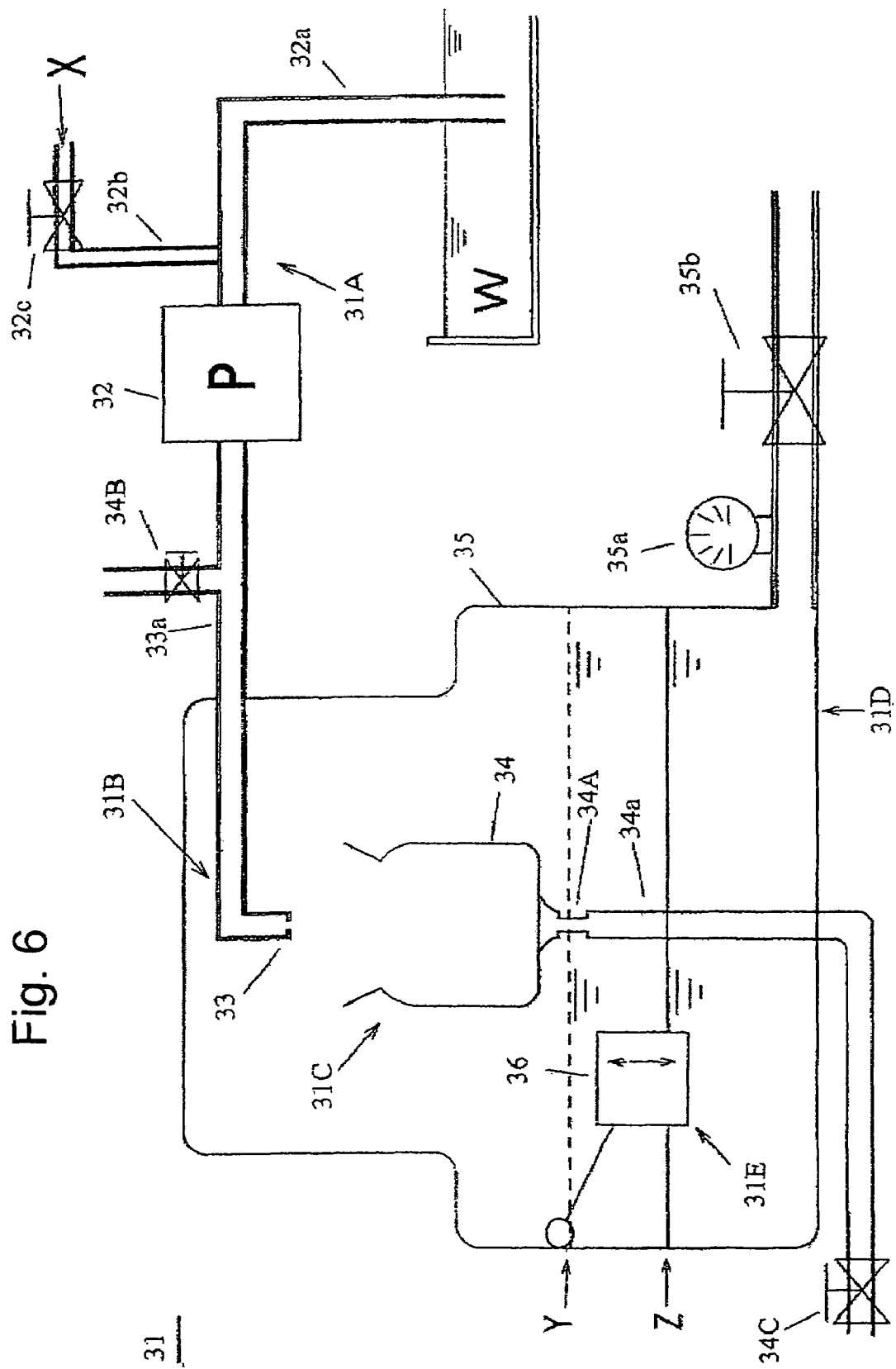
FIG. 6 is a front view of a liquid foam generation gas dissolving device according to Embodiment 4 of the invention.
Figure 7:
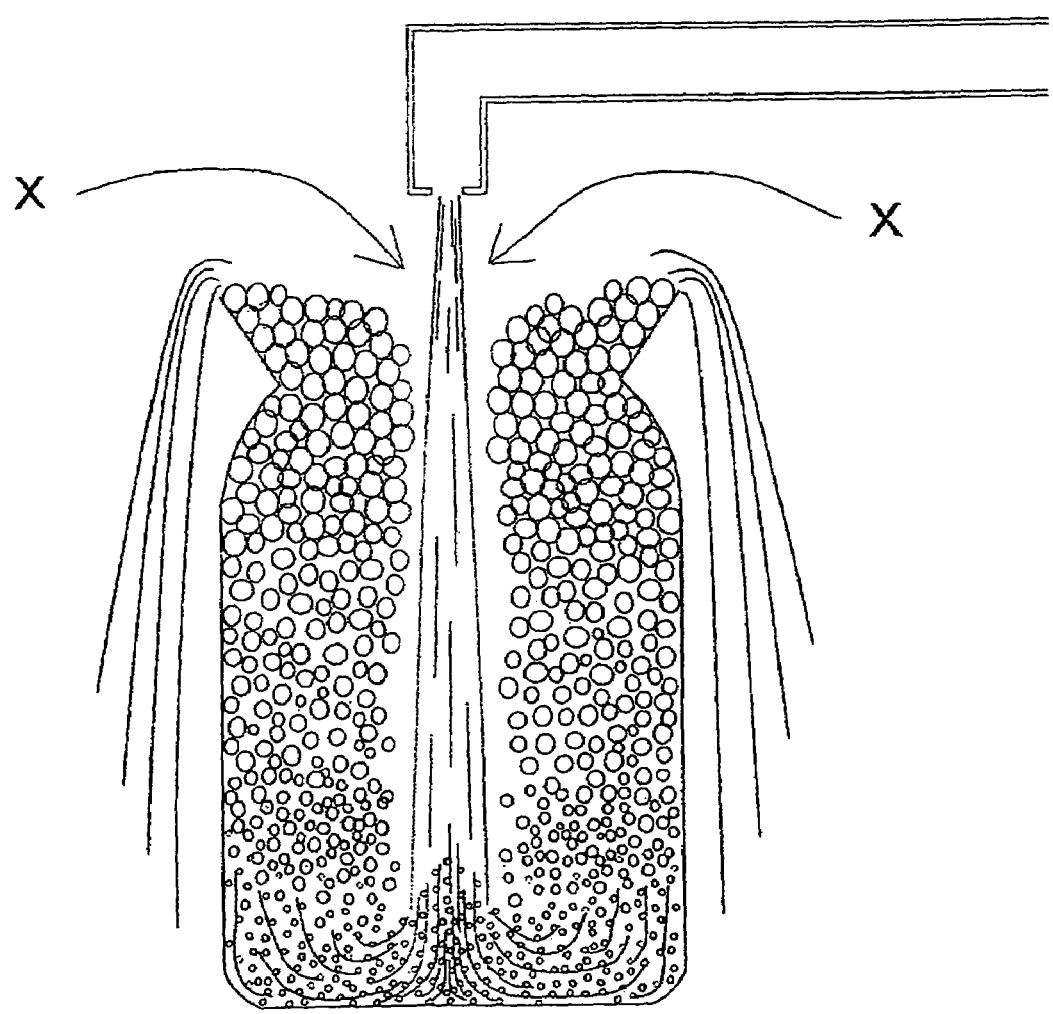
FIG. 7 is a schematic diagram showing the situation that a treated fluid W injected from a nozzle involves in surrounding gas X and thereby generates a large amount of air bubbles at the bottom part of a liquid foam generating container, so that the air bubbles rise by an effect of buoyancy and aggregate together at a lower part of a diameter reduced region of an upper part, so that the air bubbles change into liquid bubbles in the diameter reduced region and overflow from the upper end of the container.
Figure 8:
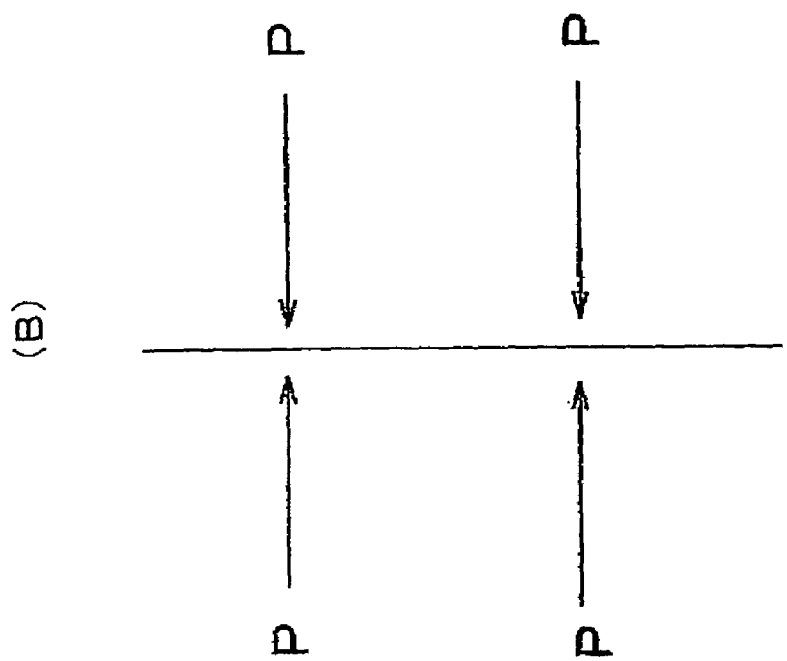
FIG. 8(A) is a schematic diagram showing the situation that pressurized gas of a liquid bubble is instantaneously dissolved into the surface water between a liquid bubble and another liquid bubble in a manner proportional to the pressure.
FIG. 8(B) is an expanded schematic diagram showing the state of the surface water of a liquid bubble.
Figure 8:
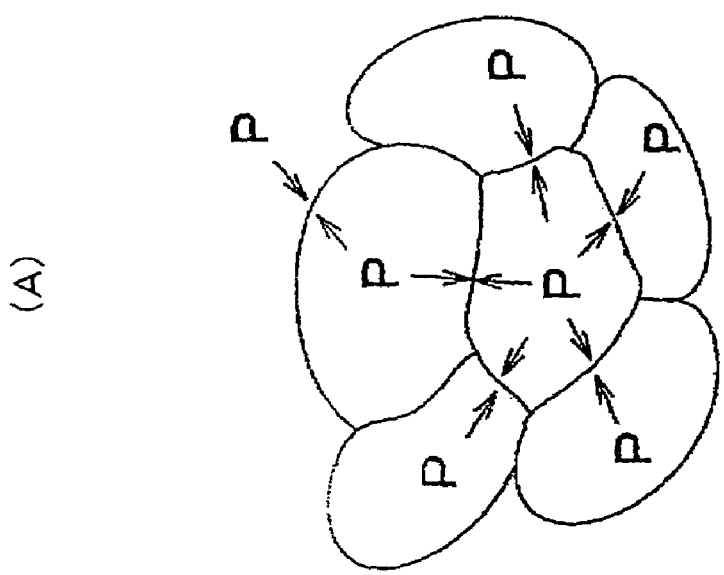

FIG. 6 is a front view of a device for controlling a dissolved amount of gas according to Embodiment 4 of the invention. FIG. 7 is a schematic diagram showing the situation that a treated fluid W injected from a nozzle involves in surrounding gas X and thereby generates a large amount of air bubbles at the bottom part of a liquid foam generating container, so that the air bubbles rise by the effect of buoyancy and aggregate together at a lower part of a diameter reduced region of an upper part, so that the air bubbles change into liquid bubbles in the diameter reduced region and then overflow.

FIG. 8(A) is a schematic diagram showing the situation that pressurized gas of a liquid bubble is instantaneously dissolved into the surface water between a liquid bubble and another liquid bubble in a manner proportional to the pressure. FIG. 8(B) is an expanded schematic diagram showing the state of the surface water of a liquid bubble.

In FIG. 6, numeral 31 indicates a device for controlling a dissolved amount of gas according to Embodiment 4. Numeral 31A indicates a pressurized gas-liquid supply part for performing the self suction of an appropriate amount of gas X and thereby generating pressure water of gas-liquid mixture. Numeral 31B indicates a nozzle part for injecting the pressure water of gas-liquid mixture via a supply pipe a portion immediately before the injection opening of which is formed at right angles, and thereby involving in a large amount of surrounding gas. Numeral 31C indicates a liquid foam generating part for generating a large amount of air bubbles at the bottom part of a container and then causing the bubbles to change into liquid bubbles in the vicinity of a diameter reduced upper region. Numeral 31D indicates a tank dissolution concentration controlling part in which the nozzle part 31B and the liquid foam generating container part 31C are attached to the upper part of a pressure resisting tank while a discharge valve is attached in the downstream, so that the pressure of the pressure resisting tank can be controlled. Numeral 31E indicates a tank water level sensor part for sensing the water level of the gas dissolving water into which the gas of the pressure resisting tank is dissolved, then transmitting the information to the pressurized gas-liquid supply part 31A so as to cause the self suction of an appropriate amount of gas, and thereby preventing the discharge of the gas from the downstream discharge valve.

Numeral 32 indicates a pressurizing pump for sucking the water to be treated and thereby generating pressure water of a gas mixture. Numeral 32*a* indicates a suction pipe connected to the suction side of the pressurizing pump 32 and sucking the water to be treated. Numeral 32*b* indicates a gas self suction pipe provided through a pore in the suction pipe 32*a* and performing the self suction of the gas. Numeral 32*c* indicates a gas self suction rate regulator valve attached to the gas self suction pipe 32*b*. Numeral 33 indicates a nozzle in which a supply pipe 33*a* portion immediately before the injection opening is formed at right angles so that disturbance is generated in a flow in the pipe, and then injection is performed through an injection opening of the shape of a circular hole. Numeral 33a indicates a supply pipe for supplying the pressurized fluid of a gas-liquid mixture generated by the pressurizing pump 32. Numeral 34 indicates a liquid foam generating container in which the injected liquid involving in the surrounding gas is received by the container so that a large amount of air bubbles are generated at the bottom part, and then the buoyancy of the air bubbles is used so that the air bubbles are changed into liquid bubbles in the diameter reduced region in the upper part, and then overflowed and discharged. Numeral 34a indicates a suspended solid discharge pipe for supporting the liquid foam generating container 34 and for discharging suspended-solid mixing water. Numeral 34A indicates a suspended solid discharge port composed of a discharge port provided at a predetermined water level in the suspended solid discharge pipe 34a and thereby performing discharge by means of overflow. Numeral 34B indicates a reducing valve for extracting the pressurized gas of the pressure resisting tank and thereby generating a reduced pressure. Numeral 34C indicates a suspended solid discharge valve in which when suspended solids appear on the water surface of the gas dissolving water by floatation separation, the valve is opened so that the suspended solids are discharged. Numeral 35 indicates a pressure resisting tank incorporating the nozzle 33 and the liquid foam generating container 34 in the upper part and storing the gas dissolving water overflowed and discharged from the liquid foam generating container 34. Numeral 35a indicates a pressure gauge sensor for measuring the pressure of the tank 35. Numeral 35b indicates a discharge valve for controlling the pressure and the discharge rate of the pressure resisting tank 35 in the downstream. Numeral 36 indicates a tank water level sensor for sensing the upper limit water level Y and the lower limit water level Z of the gas dissolving water in the pressure resisting tank 35. Symbol W indicates the water to be treated. Symbol X indicates the gas.

In the present Embodiment 4, a pore is provided in the suction pipe 32a, so that self suction of the gas is performed. Then, the gas is mixed into the pressure resisting tank, so that the gas is supplied. However, a hole may be provided in the supply pipe 33a on the pressurizing pump discharge side, so that the gas may be injected with controlling the gas rate. Alternatively, a hole may be provided in the upper part of the pressure resisting tank 35, so that the gas may be injected directly into the pressure resisting tank 35 with controlling the gas rate. In each case, operation is achieved normally. Thus, tap water, pressure water by a water head pressure, and the like can also be used. Further, the discharge valve 35b may be removed, while a power generating part for generating rotational power by means of a resistance part such as rotation blades may be attached so that a small compressor may be driven by the generated power, so that pressurized gas may be generated and utilized.

The operating method is described below for the device 31 for controlling a dissolved amount of gas according to Embodiment 4 having the above-mentioned configuration.

When the pressurizing pump 32 is operated first, the water to be treated W is sucked from the suction pipe 32a, so that a negative pressure acts inside the gas self suction pipe 32b. Thus, self suction of gas X occurs via the gas self suction rate regulator valve 32c, so that the pressurized fluid of gas-liquid mixture is transported to the supply pipe 33a on the pressurizing pump discharge side. Then, the fluid to be treated is injected from the nozzle 33 arranged at the center of the upper part of the liquid foam generating container 34 toward the center of the container. This permits the injection of the gas X into the pressure resisting tank 35 even when the inside of the pressure resisting tank 35 is in a pressurized state.

The water to be treated W injected from the nozzle 33 involves in a large amount of the surrounding gas and thereby generates a large amount of air bubbles at the bottom part of the liquid foam generating container 34, so that the air bubbles rise by the effect of buoyancy. Then, in the diameter reduced region of the upper part of the liquid foam generating container 4, the air bubbles change into liquid bubbles. Thus, the injected water to be treated W becomes the surface water of the liquid bubbles at least once, and thereby is overflowed and discharged from the liquid foam generating container 34.

The water under treatment W overflowed and discharged from the liquid foam generating container 34 becomes gas dissolving water, and then falls and stays in the pressure resisting tank 35.

At that time, when the pressure of the pressure resisting tank is sensed by the pressure gauge sensor 35a and controlled by the discharge valve 35b attached in the downstream, the inside of the pressure resisting tank can be controlled to a desired pressure.

This indicates that the gas pressure is controlled in a large amount of the liquid bubbles located in the vicinity of the diameter reduced part in the liquid foam generating container 34. Thus, the surface water of the liquid bubbles has a gas dissolution concentration proportional to the pressure, and then overflows from the liquid foam generating container 34.

In order that the gas of the pressure resisting tank 35 should not be discharged from the discharge valve 35b, an upper limit water level Y and a lower limit water level Z are set up and sensed by the tank water level sensor 36. This information is electrically transmitted to the gas self suction rate regulator valve 32c. Then, when the upper limit water level Y is reached, self suction of the gas X is started (increased). In contrast, when the lower limit water level Z is reached, self suction of the gas X is stopped (reduced). As a result, the water level of the pressure resisting tank 35 is maintained at a desired level. Thus, the gas of the pressure resisting tank is not discharged to the outside, while gas dissolving water of a desired concentration is acquired from the discharge valve 35b.

When a large amount of suspended solids are contained in the pressurized gas dissolving water, the pressurizing pump 32 may be stopped arbitrarily, while the reducing valve 34B may be opened. Then, the inside of the pressure resisting tank 35 is brought into a reduced pressure state. Thus, the dissolved gas in the gas dissolving water changes into fine air bubbles by reduced pressure foaming. Then, the fine air bubbles adhere to the suspended solids, and then rise to the water surface as a result of buoyancy. At that time, when the suspended solid discharge valve 34C is opened, the floating suspended solids are overflowed and discharged from the suspended solid discharge port 34A.

FIG. 9 shows an example of an experiment in which in the device for controlling a dissolved amount of gas, tap water is used as water to be treated while air and pure oxygen are used as gas, and in which in a state that each gas fills a pressure resisting tank, the pressure of the pressure resisting tank is varied and then the dissolved oxygen concentration (DO) is measured.

Tap water having a DO of 11.8 ppm and a water temperature of 7.9° C. was injected from a nozzle having a discharge opening diameter of 7 mm at a water pressure of 0.34 MPa, so that the device was operated. Then, the gas dissolving water was measured with two models of dissolved oxygen meters:

Model D-25 supplied from HORIBA, Ltd. and Model DOM-2000 supplied from Japan Storage Battery Co., Ltd.

Model D-25 was a measurement instrument capable of directly measuring up to a DO of 20 ppm. Thus, a sample up to a DO of 20 ppm was measured in a manner that the sensor was immersed into the intact gas dissolving water. In contrast, in the case of a sample exceeding a DO of 20 ppm, the sample was diluted by the factor of 10. Then, when the DO fell within 20 ppm, the water was measured with Model D-25 so that the DO was calculated from the obtained value.

In contrast, Model DOM-2000 was a measurement instrument capable of directly measuring up to a DO of 80 ppm at a water temperature of 4° C. Nevertheless, under the atmospheric pressure, reduced pressure foaming occurs intensely at a concentration DO of approximately 60 ppm or higher so that a large amount of the dissolved oxygen is released to the atmosphere. Thus, for the purpose of measurement as accurate as possible, the water was sampled and diluted by the factor of 10 in a short time. Then, when the water had a DO of 20 ppm or higher, this instrument was used.

The pressure gauge employed was TYPE-A0.7 supplied from Toyo Keiki Kogyo Co., Ltd. The thermometer employed was Model D616 supplied from Techno Sabun Co., Ltd.

The tank pressure 0 in FIG. 9 indicates a value of the discharged gas dissolving water obtained when the discharge valve 35b was fully opened so that the pressure gauge indicated 0.

As seen from the data of FIG. 9, when the tank is filled with oxygen, a DO of 55 ppm is achieved even in the case that the tank is at the atmospheric pressure. Thus, as for the emission rate of carbon dioxide which is a worldwide concern in view of the problem of global warming, carbon dioxide has a low Henry constant, and hence has a dissolution rate as high as approximately 30 times that of oxygen. Thus, when a pipe extending to approximately 1000-2000 m in the ocean is connected to a tank located above the water surface and storing carbon dioxide, and then when the liquid foam generating container 4 is merely arranged in the tank so that the seawater is injected from the nozzle 3 and overflowed from the liquid foam generating container 4, the carbon dioxide can be dissolved into the seawater and then transported to deep sea by self weight. Thus, the device can be used for efficiently eliminating and reducing carbon dioxide from the land. Additionally, scale up is easy if desired, and hence a large gas dissolving plant can also be constructed.

Embodiment 5

A system for controlling a dissolved amount of gas according to Embodiment 5 of the invention is described below with reference to the drawings.

Figure 10:
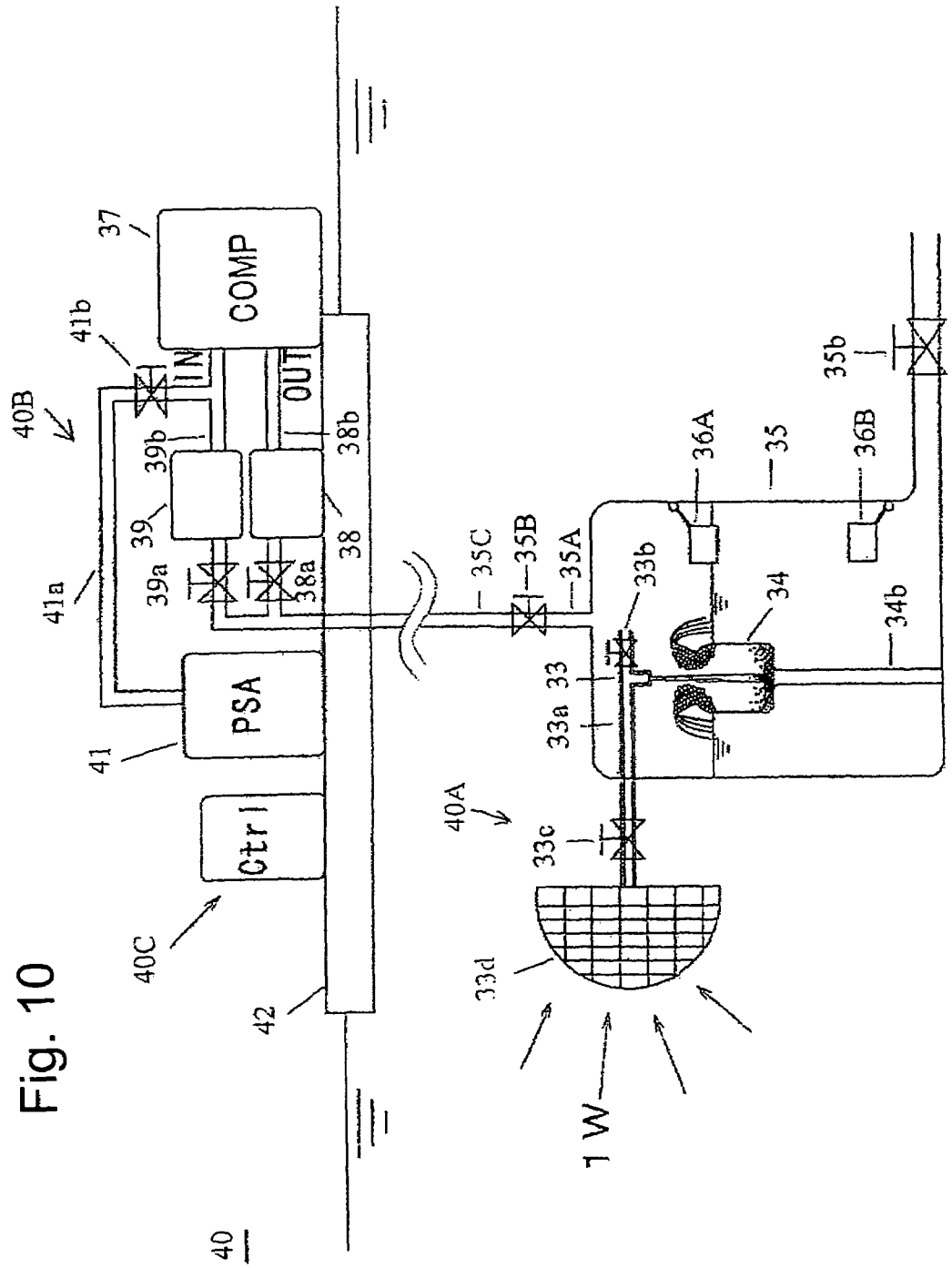

FIG. 10 is a front view showing the situation that a liquid foam generation gas dissolving system according to Embodiment 5 of the invention is disposed in a lake or the like.

In FIG. 10, numeral 40 indicates a system for controlling a dissolved amount of gas according to Embodiment 5. Numeral 40A indicates a static pressure water supply part in which static pressure water 1W having a certain water depth can be injected from a nozzle 33 via a strainer 33d, a static pressure water valve 33c, and a supply pipe 33a, and in which a reversing valve 33b is attached in the nozzle part. Numeral 40B indicates a tank pressure controlling part for controlling the gas pressure of the pressure resisting tank 35 located in a place having a certain water depth. Numeral 40C indicates a control part in which the water level of the pressure resisting tank 35 and the gas pressure of each part are sensed by sensors so that all valves are operated by means of solenoid valves. Its wiring diagram is omitted here.

The process of Embodiment 4 of generating liquid bubbles and thereby dissolving gas is almost the same, and hence description is omitted. Numeral 33d indicates a strainer having such a structure so that for dust in static pressure water 1W flowing into the pressure resisting tank 35, particles having a size larger than the diameter of the injection opening of the nozzle 33 are not allowed to pass through. Numeral 33b indicates a reversing valve attached in the vicinity of the nozzle part. Numeral 33c indicates a static pressure water valve which is opened when the static pressure water 1W flows into the pressure resisting tank 35, or when the pressurized gas is sent from the reversing valve 33b toward the strainer, and which is closed when the gas dissolving water in the pressure resisting tank 35 is discharged from the discharge valve 35b. Numeral 34b indicates a container support rod for supporting and fixing the liquid foam generating container 34. Numeral 35A indicates a gas inlet and outlet hole in which a hole is provided in the pressure resisting tank 35 upper part, so that the compressed gas generated by the compressor placed on the water surface is introduced into or extracted from the pressure resisting tank 35 through this hole. Numeral 35B indicates a gas inlet and outlet valve attached to the upper part of the gas inlet and outlet hole 35A and controlling the inlet and outlet of the gas into the pressure resisting tank. Numeral 35C indicates a pressure resisting gas hose connected from the gas inlet and outlet valve 35B to the gas pressure storage tank and the gas reduced pressure storage tank located on the water surface. Numeral 36A indicates a full water level sensor such as a float for sensing a desired full water level of the pressure resisting tank 35. Numeral 36B indicates a low water level sensor such as a float for sensing a desired low water level of the pressure resisting tank 35. Numeral 37 indicates a compressor capable of sucking or pressurizing the gas. Numeral 38 indicates a gas pressure storage tank with a pressure sensor for storing the pressurized gas from the compressor 37 via the pressurized gas supply pipe 38b. Numeral 38a indicates a pressure storage tank valve opened and closed in response to signals sensed by the full water level sensor 36A and the low water level sensor 36B. Numeral 39 indicates a gas reduced pressure storage tank with pressure sensor in which the gas stored in the tank is sucked via the suction gas supply pipe 39b connected to the gas suction opening of the compressor 37, so that the inside of the tank is brought into a reduced pressure state. Numeral 39a indicates a reduced pressure storage tank valve opened and closed in response to signals sensed by the full water level sensor 36A and the low water level sensor 36B. Numeral 41 indicates an oxygen generation device connected to an oxygen supply regulator valve 41b via an oxygen supply pipe 41a, and further connected to the suction gas supply pipe 39b. Numeral 42 indicates a floating structure floating on the water surface and carrying a generator, a compressor, and the like.

The operating method is described below for the system 40 for controlling a dissolved amount of gas constructed as described above.

First, the compressor 37 is operated. Then, the gas is sucked from the oxygen production device 41 via the oxygen supply pipe 41a and the oxygen supply regulator valve 41b into the compressor 37, so that pressurized gas is generated. Then, the pressurized gas is injected into the gas pressure storage tank 38 via the pressurized gas supply pipe 38b, so that pressurized gas having a pressure higher than the static pressure of the water depth is stored. After the static pressure water valve 33c is closed and the gas inlet and outlet valve 35B and the discharge valve 35b are opened, the pressure storage tank valve 38a is opened. As a result, liquid in the pressure resisting tank 35 is discharged into a water depth static pressure region from the discharge valve 35b. Then, the low water level sensor 36B in the pressure resisting tank 35 senses a desired water level, and then transmits a signal. In response, the discharge valve 35b and the pressure storage tank valve 38a are closed, while the reduced pressure storage tank valve 39a is opened. As a result, the pressurized gas of the pressure resisting tank 35 is sucked into the gas reduced pressure storage tank 39. The compressor 37 further sucks and reduces the pressure of the pressure resisting tank 35. The pressure sensor in the gas reduced pressure storage tank 39 senses a desired reduced pressure, and then transmits a signal. In response, the reduced pressure storage tank valve 39a and the gas inlet and outlet valve 35B are closed, while the static pressure water valve 33c is opened. As a result, the inside of the pressure resisting tank 35 is brought into a reduced pressure lower than the water depth static pressure. Thus, the static pressure water 1W is injected from the trainer 33d via the static pressure water valve 33c, the supply pipe 33a, and the nozzle 33 toward the center of the liquid foam generating container 34, so that liquid bubbles are generated, then overflows and falls, and then stays in the lower part.

When the gas dissolving liquid is accumulated in the pressure resisting tank 35, the gas of the pressure resisting tank 35 is compressed so that the gas pressure increases. Thus, the gas pressure of the liquid bubbles generated in the liquid foam generating container 34 also increases into the same value. Accordingly, the gas dissolution concentration of the surface water of the liquid bubbles increases gradually.

For example, when the reduced pressure of the gas reduced pressure storage tank 39 is set up into 0.08 MPa, the inside of the pressure resisting tank 35 has almost the same pressure of 0.08 MPa. Thus, when the static pressure water valve 33c is opened so that the liquid is injected from the nozzle 33 so that liquid bubbles are generated, the oxygen dissolution concentration at the time of initial injection becomes a DO of 74.8 ppm as shown in FIG. 9. Then, the dissolution concentration increases proportionally with increasing pressure.

In the course that the gas dissolving water is accumulated, when a desired water level is sensed by the full water level sensor 36A, a signal is transmitted so that the static pressure water valve 33c is closed while the discharge valve 35b, the gas inlet and outlet valve 35B, and the pressure storage tank valve 38a are opened. As a result, the pressurized gas of the gas pressure storage tank 38 is sent in the pressure resisting tank 35, so that the gas dissolving water in the pressure resisting tank 35 can be discharged into a water depth static pressure region from the discharge valve 35b.

The amount of gas having been dissolved is sensed by the pressure sensors built in the gas pressure storage tank 38 and the gas reduced pressure storage tank 39, so that signals are transmitted. In response, an appropriate amount is supplemented from the oxygen supply regulator valve 41b. When this process is repeated, continuous operation is achieved.

When dust sticks to the nozzle 33 and the strainer 33d, the discharge valve 35b is closed, while the static pressure water valve 33c, the gas inlet and outlet valve 35B, and the pressure storage tank valve 38a are opened. As a result, the pressurized gas first flows from the nozzle 33 discharge opening toward the strainer 33d. Then, when the reversing valve 33b is opened with a slight time lag, a large amount of the pressurized gas flows from the reversing valve 33b toward the strainer 33d, and then reaches the static pressure water 1W side. By virtue of this, the dust having stuck to the nozzle 33 and the strainer 33d is removed. For example, depending on the water quality, a program for performing reverse washing once every two hours of continuous operation may be included in the control part 40C.

The system for controlling a dissolved amount of gas 40 according to Embodiment 5 is constructed as described above, and hence has the following effects.

Gas dissolution is performed within the water level range between the full water level and the low water level of the pressure resisting tank. Thus, all valves except for the oxygen supply regulator valve 41b can be used in a full open state or a full close state. That is, partial closing is avoided in the valves. This avoids a failure in the valves caused by entering of foreign substances.

No pressurizing pump is used, while the pressurized gas from the compressor provides the power. Thus, when the valve is operated, the pressurized gas can be sent backward. This permits cleaning of the strainer and the nozzle located in a place having a certain water depth. Further, no revolving shaft of a motor or the like is necessary. This avoids the necessity of considering a sealing part in a shaft part or the like where a problem could be caused by a water pressure.

The energy on the suction side of the compressor for sucking the gas is used so that the inside of the pressure resisting tank is brought into a reduced pressure lower than the water depth static pressure. Thus, the static pressure water can be changed into the energy of injection from the nozzle, so that the gas of the pressure resisting tank can be dissolved. Further, the pressure energy of the gas discharged from the compressor feed side is used so that the gas dissolving water in the pressure resisting tank can be discharged into a static pressure water area.

Further, since the gas pressure storage tank and the gas reduced pressure storage tank are provided, the pressurized gas generated by the compressor and the pressurized gas after the operating of the water level of the pressure resisting tank return to the storage tank, and maintain the energy as the pressurized gas. Thus, when the gas is reused as such, energy saving operation is achieved.

Further, since the pressure sensors are provided in the gas pressure storage tank and the gas reduced pressure storage tank, oxygen gas of the amount dissolved and reduced may be supplemented from the oxygen supply regulator valve. Further, the low water level sensor in the pressure resisting tank indicates the low water level which is a state that water remains in the bottom of the pressure resisting tank. This prevents the gas from leaking out of the pressure resisting tank. Thus, the supplied gas can be dissolved without a loss.

As described above, a method, a device, and a system for controlling a dissolved amount of gas according to the invention are applicable to: fabrication of gas dissolution function water for washing in a semiconductor fabrication process, in which a specific gas component is dissolved; to perform deaeration removal of harmful volatile gas or the like dissolved in liquid (such as factory waste water, underground water, and fish and shellfish nursery water); and a device for fabricating deaerated water for boiler feed water and ultrasonic cleaning.

The invention is applicable also to: water quality improvement in the fish and shellfish culture industry, hydroponics, and the like; and utilization of a gas-liquid reaction in a chemical plant or the like.

What is claimed is:

1. A device for controlling a dissolved amount of gas comprising:
   a reduced pressure rise part in which a lower end of a pipe having an opening is immersed into fluid to be treated in a liquid tub, said reduced pressure rise part further includes:
      a pretreatment tank which is connected to an upper end of the pipe;
      a hole for extracting gas which is provided at a position exceeding a height of 10.33 m relative to a liquid level of the liquid tub; and
      a vacuum pump connected to the hole so that a reduced pressure space is generated in the pipe thereby suck the fluid to be treated to a level of 10 m or the like above the liquid level of the liquid tub;
   an injection supply part for injecting the fluid to be treated pressurized by a pressurizing pump through a nozzle for mixing a large amount of gas;
   an upper liquid foam generating part in which a pipe having an opening is immersed into treated fluid in a liquid tub for recovery said upper liquid foam generating part further includes:
      a tank incorporating a container which receives the fluid to be treated injected from the nozzle for generating liquid bubbles at a position of approximately 10.6-11.2 m above the liquid level of the liquid tub; and
      a hole which is provided at an upper part of the tank and is connected to the vacuum pump so that the inside of the tank is brought into a reduced pressure space; and
   a self weight recovery part in which the treated fluid goes down through the pipe by a self weight according to a water head difference, and thereby can be recovered from the liquid tub.

2. A device for controlling a dissolved amount of gas comprising:
   an injection supply part arranged in an upper part of a closed tank and injecting pressurized fluid supplied from a hot water supply machine, a tap water system, or the like for mixing in a large amount of gas of a compressed state in the tank;
   a liquid foam generating container part in which a diameter of an inner cross section of a container arranged in an upper part of the tank and, having an upward opening is reduced slightly in an upper part so that an uppermost part has a wide angled opening, through which the pressurized fluid injected from the injection supply part is received, said liquid foam generating container part being provided within the tank; and
   a discharge rate controlling part which is attached downstream of the tank and controls a discharge rate of a solution or alternatively achieves constant rate discharge, thereby controls a pressure of the gas of the tank or maintains a constant pressure.

3. A device for controlling a dissolved amount of gas according to claim 2, further comprising:
   a supply valve capable of controlling injection from the injection supply part by manually opening and closing in order to supply the fluid to be treated to the injection supply part;
   a remaining liquid discharge valve capable of discharging liquid remaining in the tank after the injection is stopped; and
   a gas supply valve capable of accelerating the discharge of the remaining liquid and supplying the new gas into the tank by supplying the gas from the upper part of the tank.

4. A device for controlling a dissolved amount of gas comprising:
   a pressurized gas-liquid supply part for sucking fluid to be treated through a suction pipe and a pressurizing pump thereby causing the gas to perform self suction from a pore provided in the suction pipe using a negative pressure and generating pressurized fluid of gas-liquid mixture in a manner controlling a self suction rate;
   a nozzle part for mixing in a large amount of surrounding gas by means of a nozzle for injecting the pressurized fluid to be treated via a supply pipe;
   a liquid foam generating container part in which the pressurized fluid to be treated is introduced from an upper part of a pressure resisting tank into a container provided in the pressure resisting tank through the nozzle so that a large amount of air bubbles is generated in the liquid at the bottom part of the container, wherein the air bubbles rise owing to buoyancy of the generated air bubbles, and change into liquid bubbles in a diameter reduced region at an upper part of the container and overflow;
   a dissolution concentration controlling tank part provided at a bottom part of the pressure resisting tank and has a discharge valve attached downstream of the pressure resisting tank to control the pressure and discharge rate of the pressure resisting tank;
   a tank water level sensor part provided inside of the pressure resisting tank for sensing a water level of gas dissolving water in the pressure resisting tank by means of a sensor such as a float; and
   a suspended solid discharge port in which when a large amount of suspended solids are mixed in the pressurized gas dissolving liquid, the pressure of the pressure resisting tank is reduced so that fine air bubbles are generated to separate and discharge the suspended solids from the pressure resisting tank.

5. A system for controlling a dissolved amount of gas comprising:
   a static pressure water supply part formed on a place having a water depth of about 30 m or more, said static pressure water supply part further includes:
      a strainer connected to a static pressure water valve and a supply pipe for controlling a dissolved amount of gas in water to be treated:
      a nozzle formed on the supply pipe for injecting the gas dissolved water to be treated;
      a liquid foam generating container having an upper opening for receiving the water to be treated injected from the nozzle; and
      a pressure resisting tank in which the liquid foam generating container is provided where pressure of the pressure resisting tank is reduced so that water to be treated with static pressure of the water depth can be injected from the nozzle to the liquid foam generating container: and
      a reversing valve which is attached to the supply pipe so that washing of the strainer can be performed by reverse flow of pressurized gas;

a tank pressure controlling part in which a hole is provided at an upper part of the pressure resisting tank, said tank pressure controlling part further includes:

a gas inlet and outlet valve for discharging and injecting the gas of the pressure resisting tank where the gas inlet and outlet valve is attached to the hole;

gas storage tanks connected to the gas inlet and outlet valve through a pressure resisting gas hose where the gas storage tanks are arranged respectively on a gas suction side and a gas feed side of a compressor located on a water surface; and valves which are attached to respective inputs of the gas storage tanks for controlling the gas pressure of the pressure resisting tank; and a control part for operating all the valves in response to information from sensors which detect a full water level and a low water level of the gas dissolving water in the pressure resisting tank and sensors which detect the pressure of the gas storage tanks.

* * * * *